United States Patent
Ramfjord et al.

(10) Patent No.: US 11,360,233 B2
(45) Date of Patent: Jun. 14, 2022

(54) SEISMIC IMAGE DATA INTERPRETATION SYSTEM

(71) Applicant: SCHLUMBERGER TECHNOLOGY CORPORATION, Sugar Land, TX (US)

(72) Inventors: Mats Stivang Ramfjord, Oslo (NO); Nader Salman, Cambridge, MA (US); Michael Hermann Nickel, Tananger (NO); Guido van der Hoff, Tananger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/646,910

(22) PCT Filed: Sep. 12, 2018

(86) PCT No.: PCT/US2018/050749
§ 371 (c)(1),
(2) Date: Mar. 12, 2020

(87) PCT Pub. No.: WO2019/055565
PCT Pub. Date: Mar. 21, 2019

(65) Prior Publication Data
US 2020/0301036 A1  Sep. 24, 2020

Related U.S. Application Data

(60) Provisional application No. 62/557,746, filed on Sep. 12, 2017.

(51) Int. Cl.
*G01V 1/50* (2006.01)
*E21B 47/002* (2012.01)
(Continued)

(52) U.S. Cl.
CPC .......... *G01V 1/50* (2013.01); *E21B 7/04* (2013.01); *E21B 47/0025* (2020.05);
(Continued)

(58) Field of Classification Search
USPC .......................................................... 702/6
See application file for complete search history.

(56) References Cited

U.S. PATENT DOCUMENTS 11,048,000 B2   6/2021  Salman et al.
11,215,723 B2   1/2022  Salman
(Continued)

FOREIGN PATENT DOCUMENTS

CA  2659020 A1  1/2008
EP  3535607 A1  9/2019
(Continued)

OTHER PUBLICATIONS

Jiang, Y. Detecting Geological Structures in Seismic vols. Using Deep Convolutional Neural Networks. Master Thesis [online], Feb. 2017 [retrieved on Jul. 2, 2021], Retrieved from the Internet: <see full URL in attached NPL> pp. 1-68. (Year: 2017).*
(Continued)

*Primary Examiner* — Paul D Lee

(57) ABSTRACT

A method can include receiving seismic image data; processing the received seismic image data to generate stratigraphic information using a trained convolution neural network that includes channels subjected to convolution, activation and pooling that reduce spatial resolution and subjected to deconvolution and concatenation that increase spatial resolution; and enhancing the seismic image data using the stratigraphic information to generate an enhanced seismic image.

17 Claims, 18 Drawing Sheets

(51) Int. Cl.
*E21B 7/04* (2006.01)
*E21B 49/00* (2006.01)
*G01V 99/00* (2009.01)

(52) U.S. Cl.
CPC .......... *E21B 49/00* (2013.01); *E21B 2200/20* (2020.05); *G01V 99/00* (2013.01); *G01V 2210/65* (2013.01); *G01V 2210/66* (2013.01)

(56) References Cited

U.S. PATENT DOCUMENTS

| | | | |
|---|---|---|---|
| 2014/0334260 | A1 | 11/2014 | Chang et al. |
| 2016/0313463 | A1 | 10/2016 | Wahrmund et al. |
| 2017/0193680 | A1 | 7/2017 | Zhang et al. |
| 2017/0286802 | A1 | 10/2017 | Mezghani et al. |
| 2018/0148492 | A1 | 5/2018 | Rothenberg et al. |
| 2019/0064378 | A1* | 2/2019 | Liu ............... G06N 3/0454 |
| 2019/0156202 | A1* | 5/2019 | Falk ............... G06N 3/0454 |
| 2019/0162868 | A1 | 5/2019 | Salman et al. |
| 2019/0383965 | A1 | 12/2019 | Salman et al. |

FOREIGN PATENT DOCUMENTS

| | | |
|---|---|---|
| WO | 2016/150472 A1 | 9/2016 |
| WO | 2017/100903 A1 | 6/2017 |
| WO | 2020146863 A1 | 7/2020 |

OTHER PUBLICATIONS

International Preliminary Report on Patentability for the counterpart International patent application PCT/US2018/050749 dated Mar. 26, 2020.

Bougher, "Machine Learning Applications to Geophysical Data Analysis," Thesis submitted in partial fulfillment of the requirements for the degree of master of science in the University of British Columbia, Aug. 2016, pp. 1-73.

Krizhevsky, et al., "ImageNet Classification with Deep Convolutional Neural Networks," Advances in Neural Information Processing 25, MIT Press, 2012.

Ronneberger, et al., "U-Net: Convolutional Networks for Biomedical Image Segmentation," The Medical Image Computing and Copmputer-Assisted Intervention (MICCAI), Springer, LNCS, vol. 9351, pp. 234-241, 2015.

Srivastava, et al., "Dropout: A simple way to prevent neural networks from over fitting", Journal of Machine Learning Research, vol. 15, pp. 1929-1958, 2014.

Yasrab, et al., "An Encoder-Decoder Based Convolution Neural Network (CNN) for Future Advanced Driver Assistance System (ADAS)," Applied Science, Mar. 23, 2017, vol. 7, No. 4, pp. 1-21.

International Search Report and Written Opinion for the counterpart International patent application PCT/US2018/050749 dated Jan. 10, 2019.

Pablo Guillen, German Larrazabal, Gladys Gonzalez, Dainis Boumber, Ricardo Vilalta, Supervised Learning to Detect Salt Body, 2015 SEG New Orleans Annual Meeting.

Adam D. Halpert, Robert G. Clapp, and Biondo Biondi, Seismic image segmentation with multiple attributes, SEG Houston 2009 International Exposition and Annual Meeting.

Alregib et al. Subsurface Structure Analysis using Computational Interpretation and Learning: A Visual Signal Processing Perspective. IEEE Signal Proces sing Magazine. Mar. 21, 2018, vol. 35, No. 2, pp. 1-21. abstract, pp. 1-17, and figures 1, 7.

Tsal et al. First Break Automatic Picking with Deep Semi-Supervised Learning Neural Network. SEG Technical Program Expanded Abstracts. Aug. 27, 2018, pp. 2181-2185. summary and pp. 2182-2184.

Lei Huang et al., "A scalable deep learning platform for identifying geologic features from seismic attributes," The Leading Edge, vol. 36, No. 3, Mar. 30, 2017, pp. 249-256.

Extended European Search Report, European Application No. 18856229.2 dated May 7, 2021, 7 pages.

Search Report and Written Opinion of International Patent Application No. PCT/US2020013283, dated May 7, 2020, 11 pages.

International Preliminary Report on Patentability of International Patent Application No. PCT/US2020013283 dated Jul. 22, 2021, 8 pages.

* cited by examiner

SEISMIC IMAGE DATA INTERPRETATION SYSTEM

RELATED APPLICATIONS

This application claims priority to and the benefit of a US provisional application having Ser. No. 62/557,746, filed 12 Sep. 2017, which is incorporated by reference herein.

BACKGROUND

In oil and gas exploration, interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc.

SUMMARY

A method can include receiving seismic image data; processing the received seismic image data to generate stratigraphic information using a trained convolution neural network that includes channels subjected to convolution, activation and pooling that reduce spatial resolution and subjected to deconvolution and concatenation that increase spatial resolution; and enhancing the seismic image data using the stratigraphic information to generate an enhanced seismic image. A system can include a processor; memory operatively coupled to the processor; and processor-executable instructions stored in the memory to instruct the system to: receive seismic image data; process the received seismic image data to generate stratigraphic information using a trained convolution neural network that includes channels subjected to convolution, activation and pooling that reduce spatial resolution and subjected to deconvolution and concatenation that increase spatial resolution; and enhance the seismic image data using the stratigraphic information to generate an enhanced seismic image. One or more computer-readable storage media can include computer-executable instructions executable to instruct a computing system to receive seismic image data; process the received seismic image data to generate stratigraphic information using a trained convolution neural network that includes channels subjected to convolution, activation and pooling that reduce spatial resolution and subjected to deconvolution and concatenation that increase spatial resolution; and enhance the seismic image data using the stratigraphic information to generate an enhanced seismic image. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
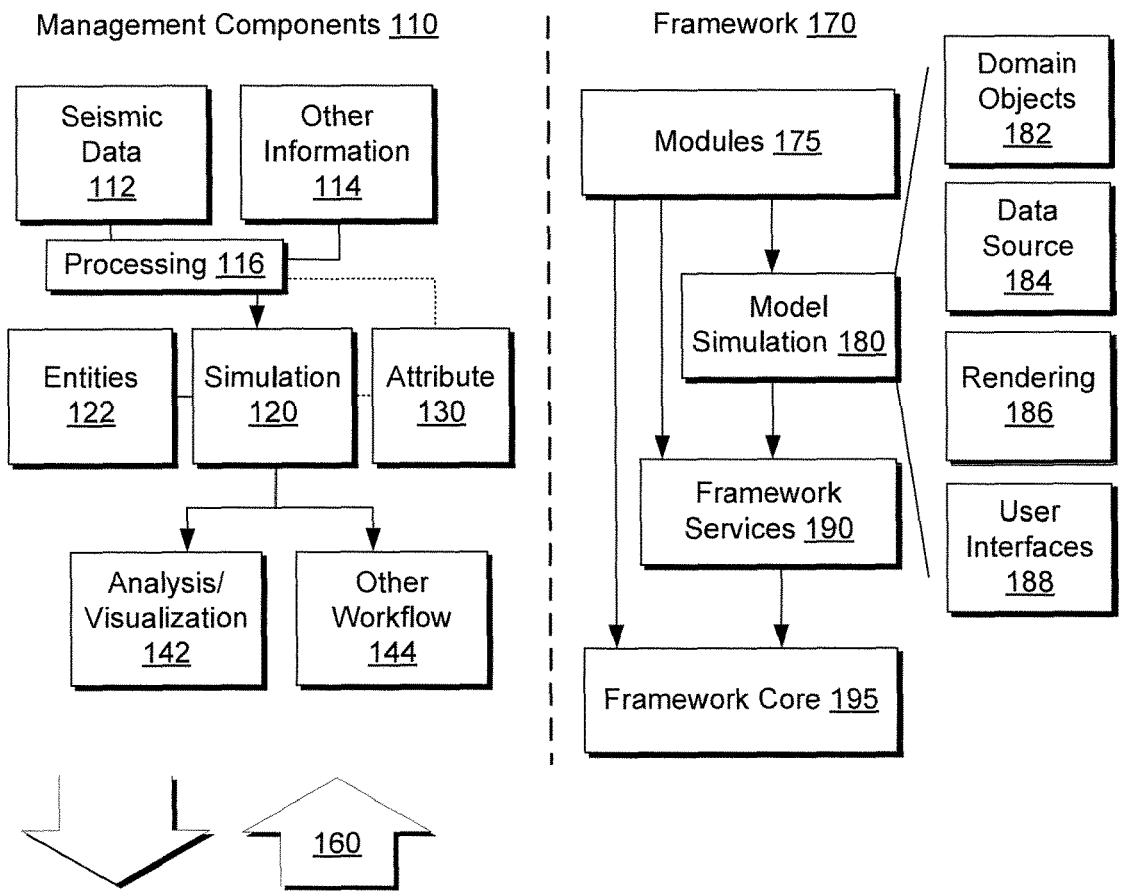
FIG. 1 illustrates an example system that includes various components for modeling a geologic environment and various equipment associated with the geologic environment.
Figure 1:
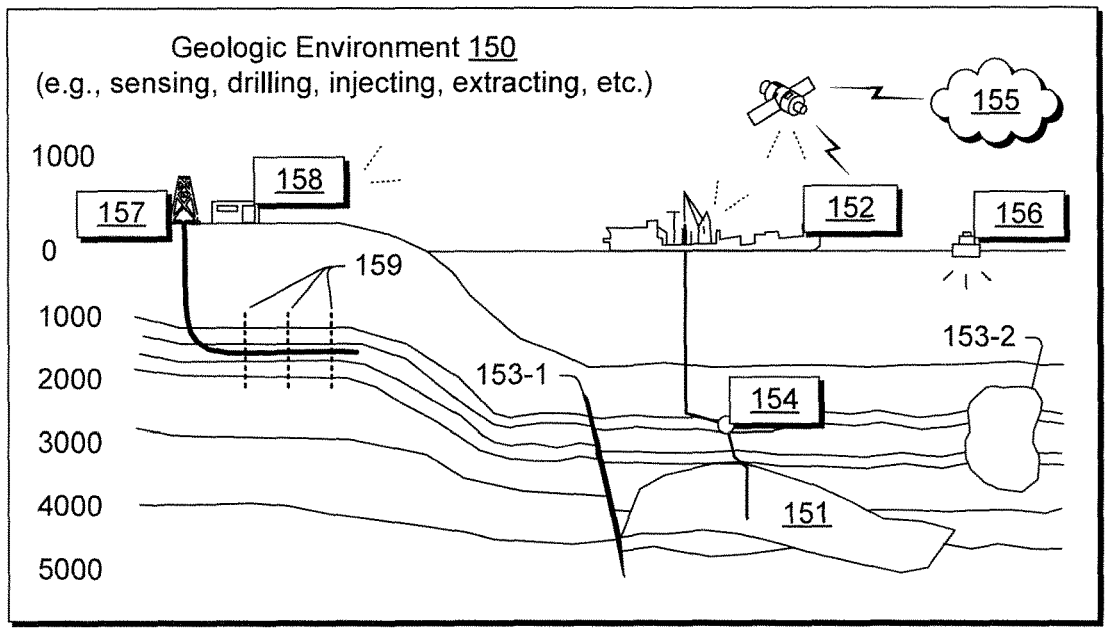

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT®.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the OCEAN® framework where the model simulation layer 180 is the PETREL® model-centric software package that hosts OCEAN® framework applications. In an example embodiment, the PETREL® software may be considered a data-driven application. The PETREL® software can include a framework for model building and visualization.

As an example, seismic data may be processed using a framework such as the OMEGA® framework (Schlumberger Limited, Houston, Tex.). The OMEGA® framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA® framework.

A framework for processing data may include features for 2D line and 3D seismic surveys. Modules for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and post-stack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
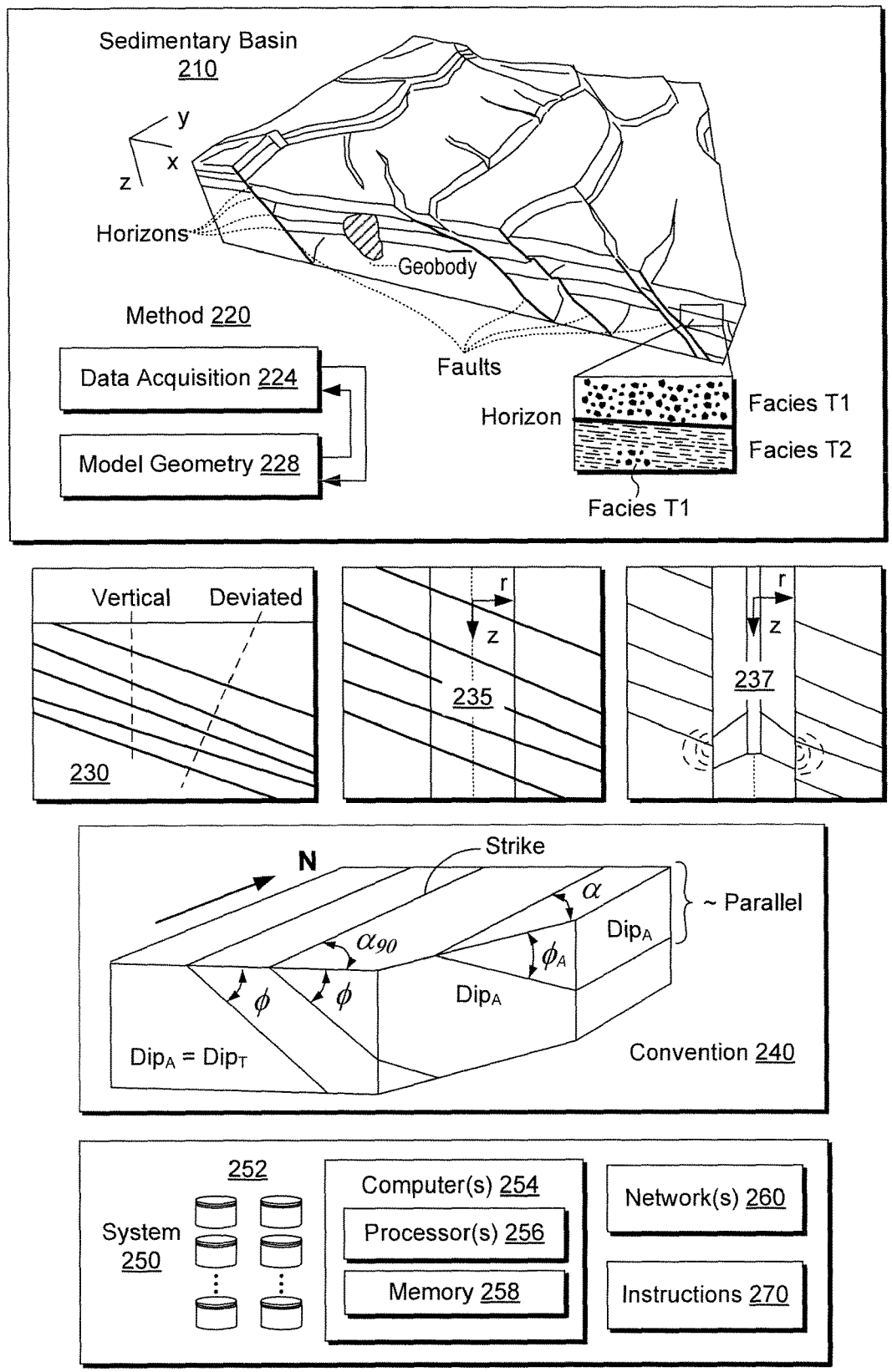
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1. One or more operations may be performed in an environment based at least in part on such characterization of a subsurface environment or environments (e.g., via acquired data, simulation, modeling, etc.).

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.). The TECHLOG® framework includes: core systems features such as BASE, C-Data-API, CoreDB, Real Time, TechData-Plus, TechStat, and Viewer; geology features such as Advanced Plotting, Field Map, Ipsom, K.mod, and Wellbore Imaging (Wbi); geomechanics features such as Completion Geomechanics, Pore Pressure Prediction, and Wellbore Stability; geophysics features such as Acoustics and Geophy; petrophysics features such as 3D Petrophysics, Acoustics, Nuclear Magnetic Resonance (NMR), Quanti., Quanti.Elan, TechCore and Thin Bed Analysis (TBA); production features such as Cased Hole, Production Logging, and Wellbore Integrity; reservoir engineering features such as Fluid Contact, Formation Pressure, Saturation-Height Modeling (SHM), and TechCore; and shale features such as Unconventionals and Quanti.Elan.

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle α); however, it is possible that the apparent dip is equal to the true dip (see, e.g., φ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with φ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Data-based interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more sets of instructions 270. As to the one or more computers 254, each computer may include one or more processors (e.g., or processing cores) 256 and memory 258 for storing instructions (e.g., one or more of the one or more sets of instructions 270), for example, executable by at least one of the one or more processors 256. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more sets of instructions 270 may include instructions (e.g., stored in the memory 258) executable by one or more processors of the one or more processors 256 to instruct the system 250 to perform various actions. As an example, the system 250 may be configured such that the one or more sets of instructions 270 provide for establishing the framework 170 of FIG. 1 or a portion thereof. As an example, one or more methods, techniques, etc. may be performed using one or more sets of instructions, which may be, for example, one or more of the one or more sets of instructions 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than about 1 Hz and/or optionally more than about 100 Hz). Seismic data may be processed and interpreted, for example, to understand better composition, fluid content, extent and geometry of subsurface rocks.

Figure 3:
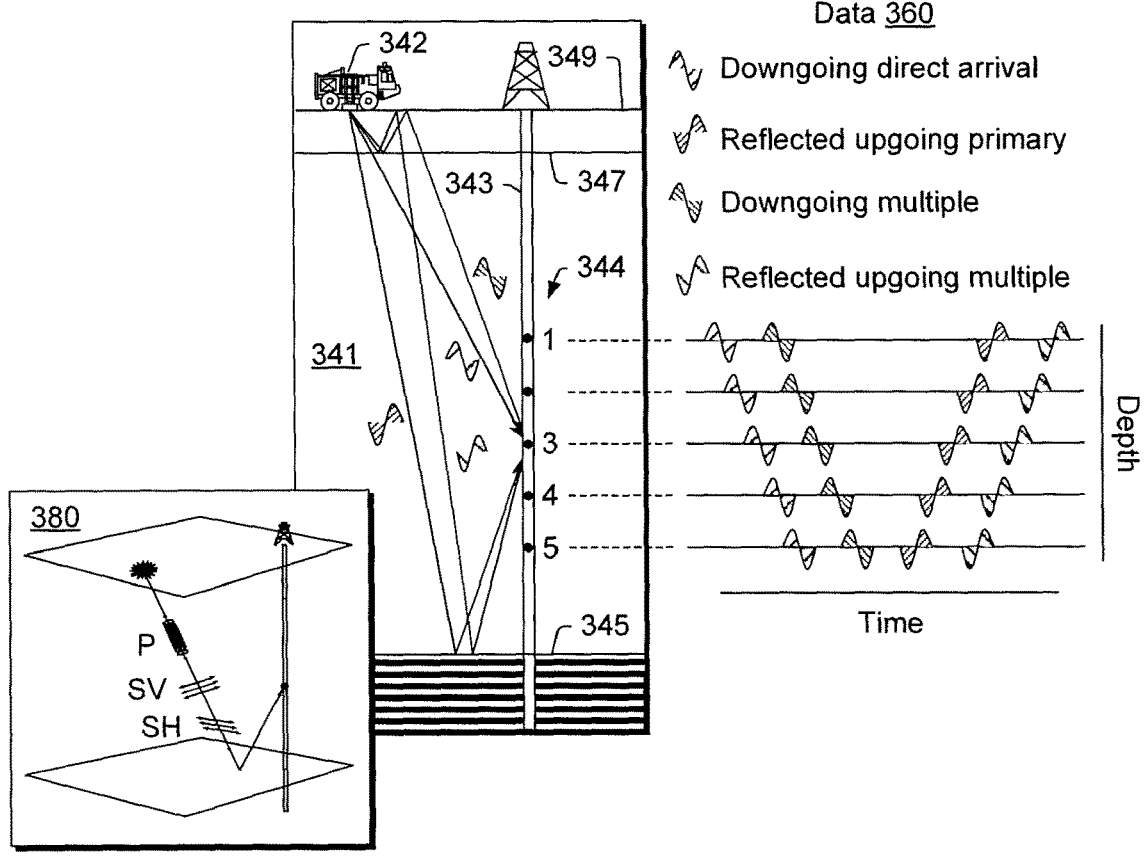
FIG. 3 illustrates an example of a technique that may acquire data.
Figure 3:
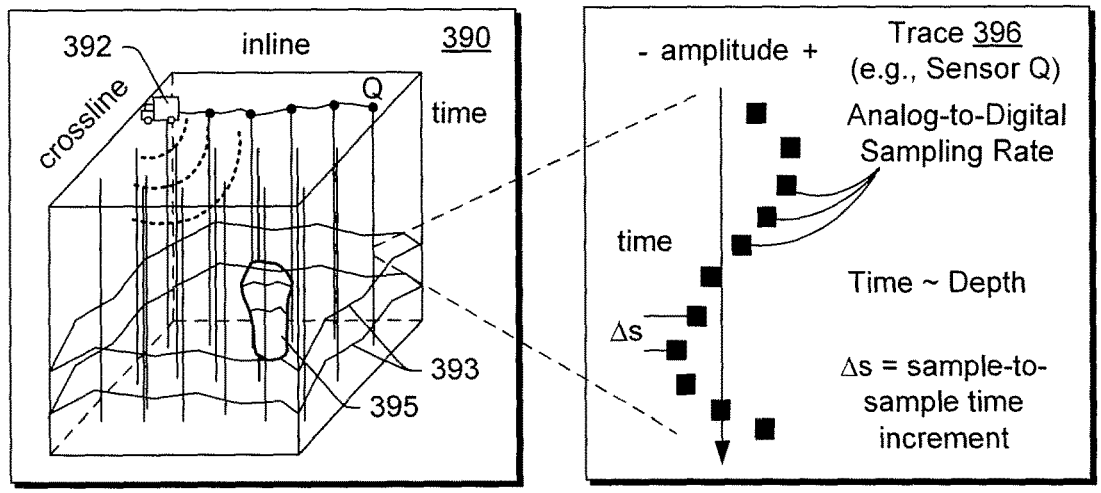

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy, etc.), consider the Thomsen parameters $\epsilon$, $\delta$ and $\gamma$. The Thomsen parameter $\delta$ can describe offset effects (e.g., short offset). As to the Thomsen parameter $\epsilon$, it can describe offset effects (e.g., a long offset) and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave.

As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, a fluid flow model, etc.).

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

A 4D seismic survey involves acquisition of 3D seismic data at different times over a particular area. Such an approach can allow for assessing changes in a producing hydrocarbon reservoir with respect to time. As an example, changes may be observed in one or more of fluid location and saturation, pressure and temperature. 4D seismic data can be considered to be a form of time-lapse seismic data.

As an example, a seismic survey and/or other data acquisition may be for onshore and/or offshore geologic environments. As to offshore, streamers, seabed cables, nodes and/or other equipment may be utilized. As an example, nodes can be utilized as an alternative and/or in addition to seabed cables, which have been installed in several fields to acquire 4D seismic data. Nodes can be deployed to acquire seismic data (e.g., 4D seismic data) and can be retrievable after acquisition of the seismic data. As an example, a 4D seismic survey may call for one or more processes aimed at repeatability of data. A 4D survey can include two phases: a baseline survey phase and a monitor survey phase.

As an example, seismic data may be processed in a technique called "depth imaging" to form an image (e.g., a depth image) of reflection amplitudes in a depth domain for a particular target structure (e.g., a geologic subsurface region of interest).

As an example, seismic data may be processed to obtain an elastic model pertaining to elastic properties of a geologic subsurface region. For example, consider elastic properties such as density, compressional (P) impedance, compression velocity ($v_p$)-to-shear velocity ($v_s$) ratio, anisotropy, etc. As an example, an elastic model can provide various insights as to a surveyed region's lithology, reservoir quality, fluids, etc.

Figure 4:
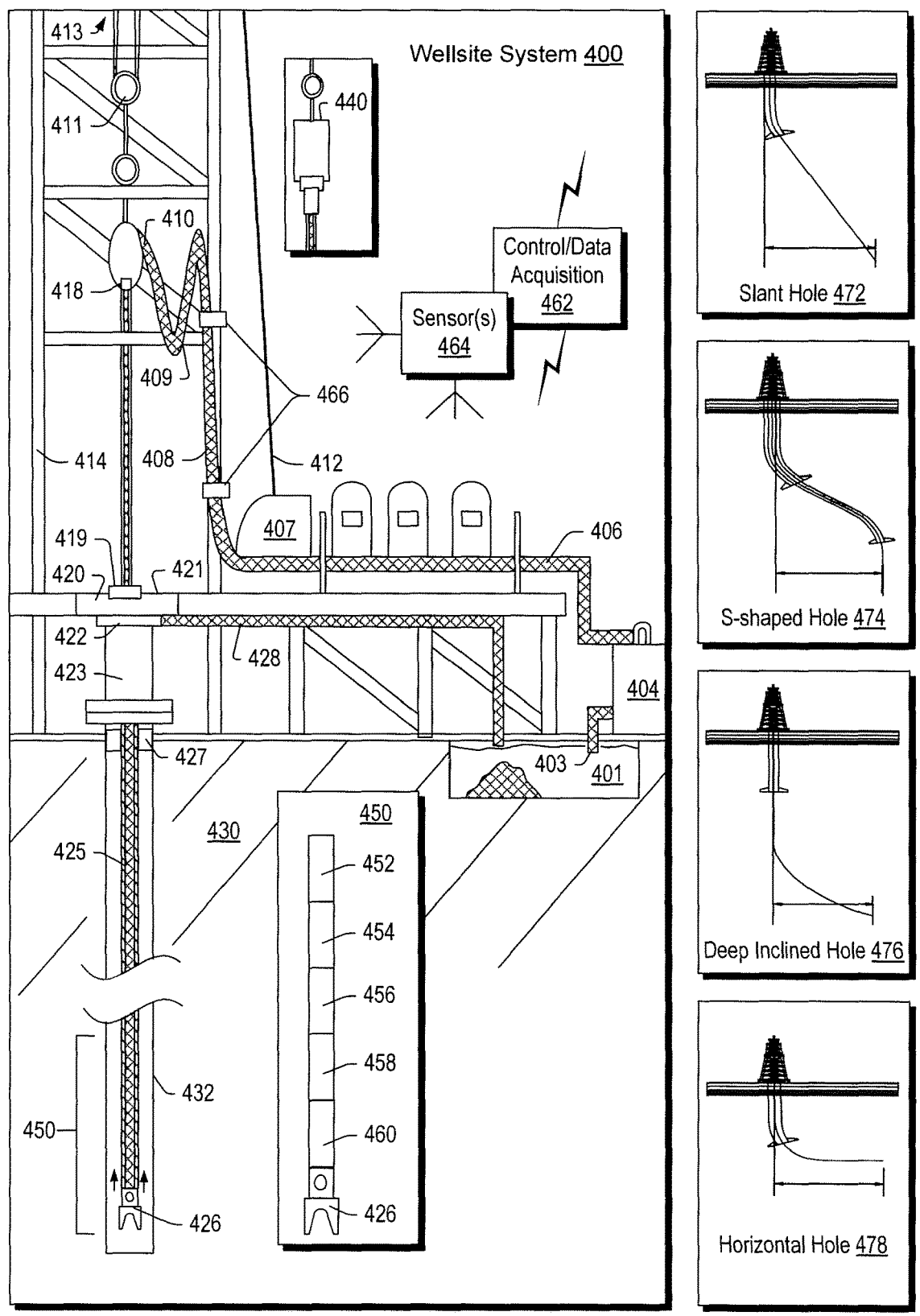
FIG. 4 illustrates examples of equipment including examples of downhole tools and examples of bores.

FIG. 4 shows an example of a wellsite system 400 (e.g., at a wellsite that may be onshore or offshore). As shown, the wellsite system 400 can include a mud tank 401 for holding mud and other material (e.g., where mud can be a drilling fluid), a suction line 403 that serves as an inlet to a mud pump 404 for pumping mud from the mud tank 401 such that mud flows to a vibrating hose 406, a drawworks 407 for winching drill line or drill lines 412, a standpipe 408 that receives mud from the vibrating hose 406, a kelly hose 409 that receives mud from the standpipe 408, a gooseneck or goosenecks 410, a traveling block 411, a crown block 413 for carrying the traveling block 411 via the drill line or drill lines 412, a derrick 414, a kelly 418 or a top drive 440, a kelly drive bushing 419, a rotary table 420, a drill floor 421, a bell nipple 422, one or more blowout preventors (BOPS) 423, a drillstring 425, a drill bit 426, a casing head 427 and a flow pipe 428 that carries mud and other material to, for example, the mud tank 401.

In the example system of FIG. 4, a borehole 432 is formed in subsurface formations 430 by rotary drilling; noting that various example embodiments may also use directional drilling.

As shown in the example of FIG. 4, the drillstring 425 is suspended within the borehole 432 and has a drillstring assembly 450 that includes the drill bit 426 at its lower end. As an example, the drillstring assembly 450 may be a bottom hole assembly (BHA).

The wellsite system 400 can provide for operation of the drillstring 425 and other operations. As shown, the wellsite system 400 includes the traveling block 411 and the derrick 414 positioned over the borehole 432. As mentioned, the wellsite system 400 can include the rotary table 420 where the drillstring 425 passes through an opening in the rotary table 420.

As shown in the example of FIG. 4, the wellsite system 400 can include the kelly 418 and associated components, etc., or a top drive 440 and associated components. As to a kelly example, the kelly 418 may be a square or hexagonal metal/alloy bar with a hole drilled therein that serves as a mud flow path. The kelly 418 can be used to transmit rotary motion from the rotary table 420 via the kelly drive bushing 419 to the drillstring 425, while allowing the drillstring 425 to be lowered or raised during rotation. The kelly 418 can pass through the kelly drive bushing 419, which can be driven by the rotary table 420. As an example, the rotary table 420 can include a master bushing that operatively couples to the kelly drive bushing 419 such that rotation of the rotary table 420 can turn the kelly drive bushing 419 and hence the kelly 418. The kelly drive bushing 419 can include an inside profile matching an outside profile (e.g., square, hexagonal, etc.) of the kelly 418; however, with slightly larger dimensions so that the kelly 418 can freely move up and down inside the kelly drive bushing 419.

As to a top drive example, the top drive 440 can provide functions performed by a kelly and a rotary table. The top drive 440 can turn the drillstring 425. As an example, the top drive 440 can include one or more motors (e.g., electric and/or hydraulic) connected with appropriate gearing to a short section of pipe called a quill, that in turn may be screwed into a saver sub or the drillstring 425 itself. The top drive 440 can be suspended from the traveling block 411, so the rotary mechanism is free to travel up and down the derrick 414. As an example, a top drive 440 may allow for drilling to be performed with more joint stands than a kelly/rotary table approach.

In the example of FIG. 4, the mud tank 401 can hold mud, which can be one or more types of drilling fluids. As an example, a wellbore may be drilled to produce fluid, inject fluid or both (e.g., hydrocarbons, minerals, water, etc.).

In the example of FIG. 4, the drillstring 425 (e.g., including one or more downhole tools) may be composed of a series of pipes threadably connected together to form a long tube with the drill bit 426 at the lower end thereof. As the drillstring 425 is advanced into a wellbore for drilling, at some point in time prior to or coincident with drilling, the mud may be pumped by the pump 404 from the mud tank 401 (e.g., or other source) via a lines 406, 408 and 409 to a port of the kelly 418 or, for example, to a port of the top drive 440. The mud can then flow via a passage (e.g., or passages) in the drillstring 425 and out of ports located on the drill bit 426 (see, e.g., a directional arrow). As the mud exits the drillstring 425 via ports in the drill bit 426, it can then circulate upwardly through an annular region between an outer surface(s) of the drillstring 425 and surrounding wall(s) (e.g., open borehole, casing, etc.), as indicated by directional arrows. In such a manner, the mud lubricates the drill bit 426 and carries heat energy (e.g., frictional or other energy) and formation cuttings to the surface where the mud (e.g., and cuttings) may be returned to the mud tank 401, for example, for recirculation (e.g., with processing to remove cuttings, etc.).

The mud pumped by the pump 404 into the drillstring 425 may, after exiting the drillstring 425, form a mudcake that lines the wellbore which, among other functions, may reduce friction between the drillstring 425 and surrounding wall(s) (e.g., borehole, casing, etc.). A reduction in friction may facilitate advancing or retracting the drillstring 425. During a drilling operation, the entire drill string 425 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 426 of the drill string 425 at a bottom of a wellbore, pumping of the mud commences to lubricate the drill bit 426 for purposes of drilling to enlarge the wellbore. As mentioned, the mud can be pumped by the pump 404 into a passage of the drillstring 425 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 425) may be transmitted uphole to an uphole device, which may relay such information to other equipment for processing, control, etc.

As an example, telemetry equipment may operate via transmission of energy via the drillstring 425 itself. For example, consider a signal generator that imparts coded energy signals to the drillstring 425 and repeaters that may receive such energy and repeat it to further transmit the coded energy signals (e.g., information, etc.).

As an example, the drillstring 425 may be fitted with telemetry equipment 452 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 4, an uphole control and/or data acquisition system 462 may include circuitry to sense pressure pulses generated by telemetry equipment 452 and, for example, communicate sensed pressure pulses or information derived therefrom for process, control, etc.

The assembly 450 of the illustrated example includes a logging-while-drilling (LWD) module 454, a measuring-while-drilling (MWD) module 456, an optional module 458, a roto-steerable system and motor 460, and the drill bit 426.

The LWD module 454 may be housed in a suitable type of drill collar and can contain one or a plurality of selected types of logging tools. It will also be understood that more than one LWD and/or MWD module can be employed, for example, as represented at by the module 456 of the drillstring assembly 450. Where the position of an LWD module is mentioned, as an example, it may refer to a module at the position of the LWD module 454, the module 456, etc. An LWD module can include capabilities for measuring, processing, and storing information, as well as for communicating with the surface equipment. In the illustrated example, the LWD module 454 may include a seismic measuring device.

The MWD module 456 may be housed in a suitable type of drill collar and can contain one or more devices for measuring characteristics of the drillstring 425 and the drill bit 426. As an example, the MWD tool 454 may include equipment for generating electrical power, for example, to power various components of the drillstring 425. As an example, the MWD tool 454 may include the telemetry equipment 452, for example, where the turbine impeller can generate power by flow of the mud; it being understood that other power and/or battery systems may be employed for purposes of powering various components. As an example, the MWD module 456 may include one or more of the following types of measuring devices: a weight-on-bit measuring device, a torque measuring device, a vibration measuring device, a shock measuring device, a stick slip measuring device, a direction measuring device, and an inclination measuring device.

FIG. 4 also shows some examples of types of holes that may be drilled. For example, consider a slant hole 472, an S-shaped hole 474, a deep inclined hole 476 and a horizontal hole 478.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 4, the wellsite system 400 can include one or more sensors 464 that are operatively coupled to the control and/or data acquisition system 462. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 400. As an example, a sensor or sensor may be at an offset wellsite where the wellsite system 400 and the offset wellsite are in a common field (e.g., oil and/or gas field).

As an example, one or more of the sensors 464 can be provided for tracking pipe, tracking movement of at least a portion of a drillstring, etc.

As an example, the system 400 can include one or more sensors 466 that can sense and/or transmit signals to a fluid conduit such as a drilling fluid conduit (e.g., a drilling mud conduit). For example, in the system 400, the one or more sensors 466 can be operatively coupled to portions of the standpipe 408 through which mud flows. As an example, a downhole tool can generate pulses that can travel through the mud and be sensed by one or more of the one or more sensors 466. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 400 can include a transmitter that can generate signals that can be transmitted downhole via mud (e.g., drilling fluid) as a transmission medium.

Figure 5:
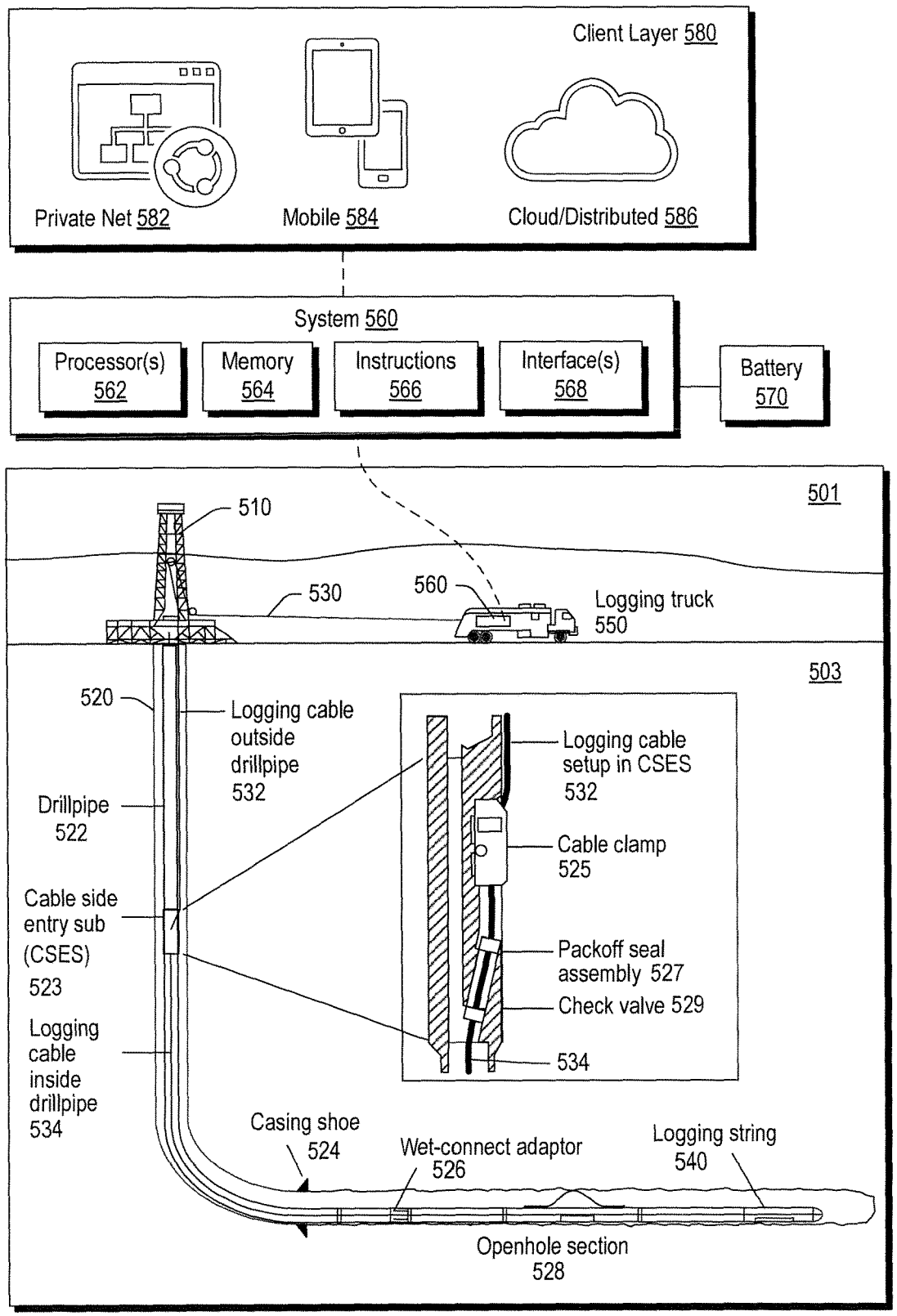
FIG. 5 illustrates examples of equipment including examples of downhole tools.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

As an example, a seismic workflow may provide for processing of microseismic data as a type of seismic data. Microseismic monitoring (e.g., a type of seismic survey) provides a valuable tool to evaluate hydraulic fracture treatments in real-time and can be utilized in planning and managing reservoir development. Microseismic event locations, source characteristics and attributes provide can provide estimates of hydraulic fracturing geometry that can be evaluated with respect to a completion plan and expected fracture growth. Microseismic event derived attributes such as fracture azimuth, height and length, location and complexity, may be utilized to determine the extent of fracture coverage of the reservoir target and effective stimulated volume, as well as in diagnosing under-stimulated sections of the reservoir and in planning re-stimulation of under-producing perforations and wells. Microseismic event locations can also help to avoid hazards during stimulation (e.g. faults, karst, aquifers, etc.). As an example, a method can include modifications to one or more treatment plans and operations based at least in part on microseismic interpretations as part of a seismic interpretation workflow.

Integrated workflows leveraging multi-scale, multi-domain measurements and microseismic interpretation can allow for optimization of hydraulic fracturing treatment for increased production. Such integrated completions planning workflows may use a wide variety of information about the geology (e.g., lithology, stress contrast, natural fracturing, structural or depositional dip, faulting), and the associated rock properties, (e.g., noise, slowness, anisotropy, attenuation) to improve hydraulic fracturing operations to lead to improved hydraulic fracture stimulations, completion plans, and well placement and, thereby, improved production. As an example, microseismic event locations and attributes may be integrated and compared with treatment pressure records, proppant concentration, and injection rate to better perform field operations.

FIGS. 1, 2, 3, 4 and 5 show various examples of equipment in various examples of environments. As an example, one or more workflows may be implemented to perform operations using equipment in one or more environments. As an example, a workflow may aim to understand an environment. As an example, a workflow can include performing a seismic survey, which may be land-based, sea-based (e.g., vessel, ocean bottom, etc.) or land and sea-based. As an example, a seismic survey can include an acquisition geometry where receivers and/or sources are positioned according to the acquisition geometry. As an example, a seismic survey may be performed using one or more receivers and/or one or more sources positioned in a subterranean environment, for example, in a borehole. As an example, a workflow can include acquiring various types of data, which may include seismic data as a type of data and one or more other types of geophysical data, which may include imagery data (e.g., borehole imagery, satellite imagery, drone imagery, etc.).

As an example, a workflow may aim to drill into an environment, for example, to form a bore defined by surrounding earth (e.g., rock, fluids, etc.). As an example, a workflow may aim to acquire data from a downhole tool disposed in a bore where such data may be acquired via a drilling tool (e.g., as part of a bottom hole assembly) and/or a wireline tool. As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

Figure 6:
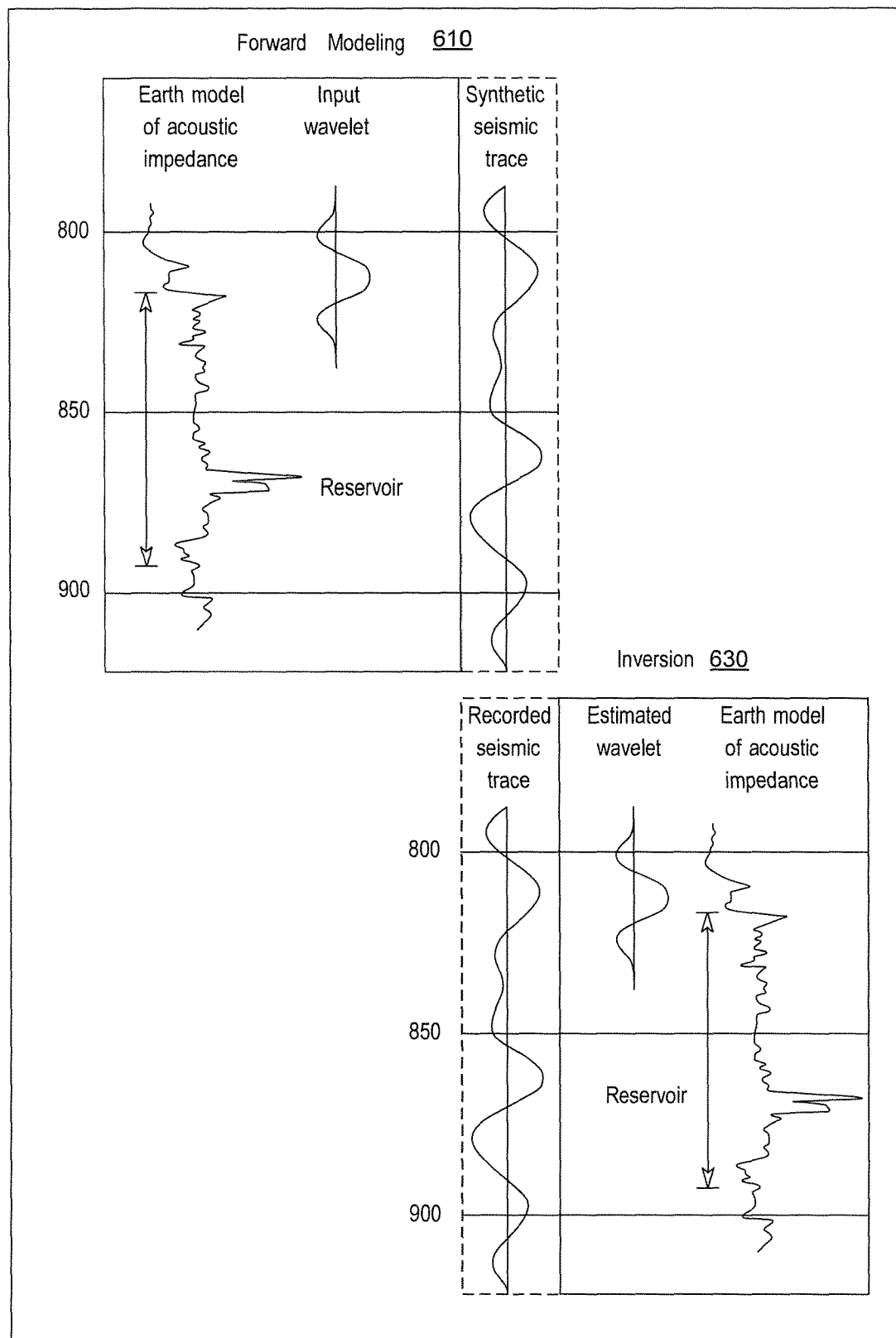
FIG. 6 illustrates an example of forward modeling and inversion as to seismic data and an Earth model of acoustic impedance.

FIG. 6 shows an example of forward modeling 610 and an example of inversion 630 (e.g., an inversion or inverting). As shown, the forward modeling 610 progresses from an earth model of acoustic impedance and an input wavelet to a synthetic seismic trace while the inversion 630 progresses from a recorded seismic trace to an estimated wavelet and an earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

As an example, a method may employ amplitude inversion. For example, an amplitude inversion method may receive arrival times and amplitude of reflected seismic waves at a plurality of reflection points to solve for relative impedances of a formation bounded by the imaged reflectors. Such an approach may be a form of seismic inversion for reservoir characterization, which may assist in generation of models of rock properties.

As an example, an inversion process can commence with forward modeling, for example, to provide a model of layers with estimated formation depths, thicknesses, densities and velocities, which may, for example, be based at least in part on information such as well log information. A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace.

Inversion can aim to generate a "best-fit" model by, for example, iterating between forward modeling and inversion while seeking to minimize differences between a synthetic trace or traces and actual seismic data.

As an example, a framework such as the ISIS inversion framework (Schlumberger Limited, Houston Tex.) may be implemented to perform an inversion. As an example, a framework such as the Linearized Orthotropic Inversion framework (Schlumberger Limited, Houston, Tex.) may be implemented to perform an inversion.

As mentioned above, as to seismic data, forward modeling can include receiving an earth model of acoustic impedance and an input wavelet to a synthetic seismic trace while inverting can include progressing from a recorded seismic trace to an estimated wavelet and an earth model of acoustic impedance.

As an example, another approach to forward modeling and inversion can be for measurements acquired at least in part via a downhole tool where such measurements can include one or more of different types of measurements, which may be referred to as multi-physics measurements. As an example, multi-physics measurements may include logging while drilling (LWD) measurements and/or wireline measurements. As an example, a method can include joint petrophysical inversion (e.g., inverting) for interpretation of multi-physics logging-while-drilling (LWD) measurements and/or wireline (WL) measurements.

As an example, a method can include estimating static and/or dynamic formation properties from a variety of logging while drilling (LWD) measurements (e.g., including pressure, resistivity, sonic, and nuclear data) and/or wireline (WL) measurements, which can provide for, at least, formation parameters that characterize a formation. As an example, where a method executes during drilling, LWD measurements may be utilized in a joint inversion to output formation parameters (e.g., formation parameter values) that may be utilized to guide the drilling (e.g., to avoid sticking, to diminish one or more types of formation damage, etc.).

In petroleum exploration and development, formation evaluation is performed for interpreting data acquired from a drilled borehole to provide information about the geological formations and/or in-situ fluid(s) that can be used for assessing the producibility of reservoir rocks penetrated by the borehole.

As an example, data used for formation evaluation can include one or more of core data, mud log data, wireline log data (e.g., wireline data) and LWD data, the latter of which may be a source for certain type or types of formation evaluation (e.g., particularly when wireline acquisition is operationally difficult and/or economically unviable).

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

Table 1, below, shows some examples of data, which may be referred to as "log" data that are associated with petrophysical and rock physics properties calculation and analysis.

TABLE 1

Examples of Log Data

| Name | Uses |
| --- | --- |
| Gamma Ray (GR) | Lithology interpretation, shale volume calculation, calculate clay volume, permeability calculation, porosity calculation, wave velocity calculation, etc. |
| Spontaneous Potential (SP) | Lithology interpretation, Rw and Rwe calculation, detect permeable zone, etc. |
| Caliper (CALI) | Detect permeable zone, locate a bad hole |
| Shallow Resistivity (LLS and ILD) | Lithology interpretation, finding hydrocarbon bearing zone, calculate water saturation, etc. |
| Deep Resistivity (LLD and ILD) | Lithology interpretation, finding hydrocarbon bearing zone, calculate water saturation, etc. |
| Density (RHOB) | Lithology interpretation, finding hydrocarbon bearing zone, porosity calculation, rock physics properties (AI, SI, $\sigma$, etc.) calculation, etc. |
| Neutron Porosity (BPHI or TNPH or NPHI) | Finding hydrocarbon bearing zone, porosity calculation, etc. |
| Sonic (DT) | Porosity calculation, wave velocity calculation, rock physics properties (AI, SI, $\sigma$, etc.) calculation, etc. |
| Photoelectric (PEF) | Mineral determination (for lithology interpretation) |

Information from one or more interpretations can be utilized in one or more manners with a system that may be a well construction ecosystem. For example, seismic data may be acquired and interpreted and utilized for generating one or more models (e.g., earth models) for purposes of construction and/or operation of one or more wells.

Figure 7:
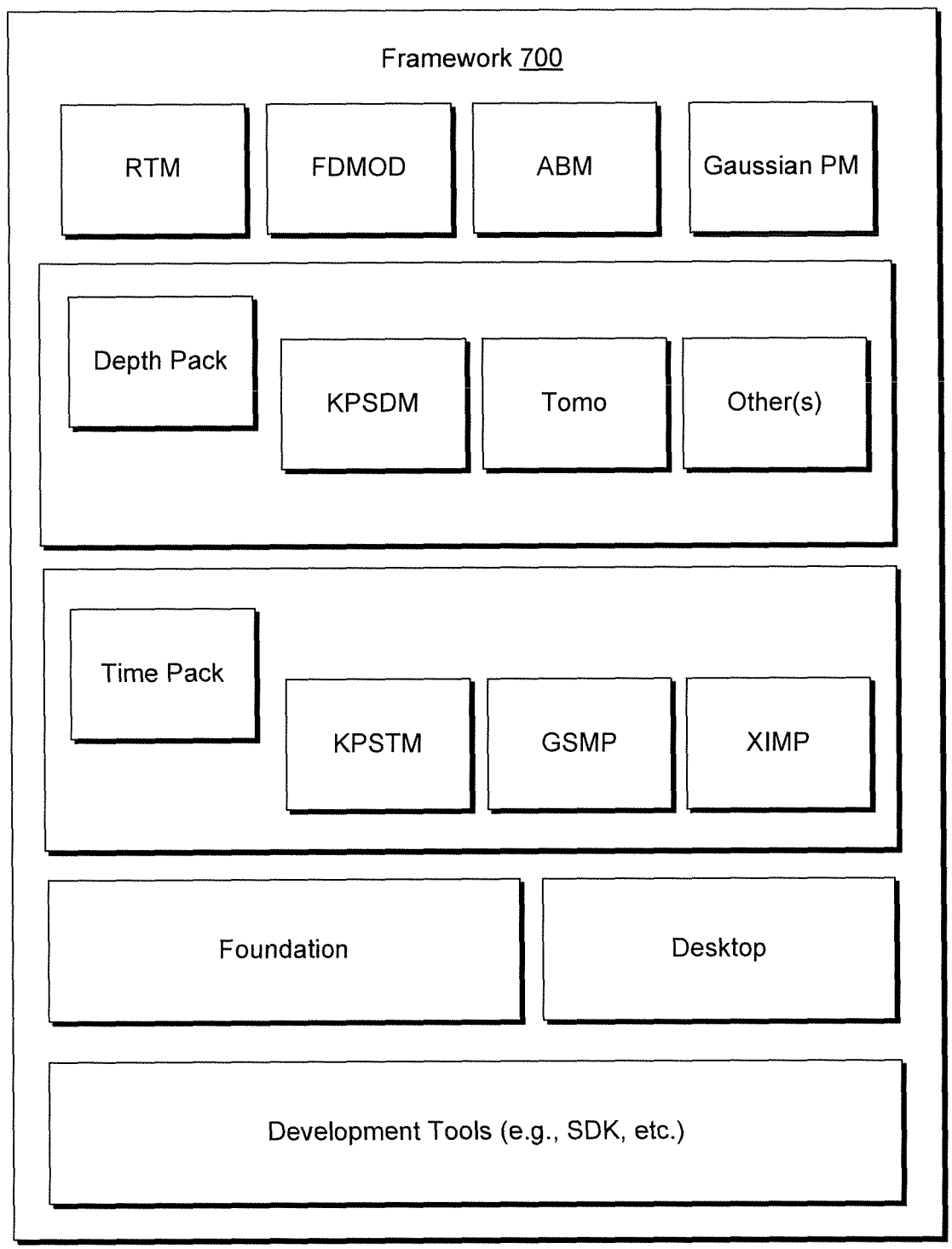
FIG. 7 illustrates an example of a computational framework.

FIG. 7 shows an example of a computational framework 700 that can include one or more processors and memory, as well as, for example, one or more interfaces. The computational framework of FIG. 7 can include one or more features of the OMEGA® framework (Schlumberger Limited, Houston, Tex.), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 7, the computational framework 700 includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

The framework 700 can include features for geophysics data processing. The framework 700 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The framework 700 can allow for transforming seismic, electromagnetic, microseismic, and/or vertical seismic profile (VSP) data into actionable information, for example, to perform one or more actions in the field for purposes of resource production, etc. The framework 700 can extend workflows into reservoir characterization and earth modelling. For example, the framework 700 can extend geophysics data processing into reservoir modelling by integrating with the PETREL® framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 700 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size (e.g., a grid cell model size). Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

As an example, as survey data become available, interpretation tasks may be performed for building, adjusting, etc., one or more models of a geologic environment. For example, consider a vessel that transmits a portion of acquired data while at sea and that transmits a portion of acquired data while in port, which may include physically offloading one or more storage devices and transporting such one or more storage devices to an onshore site that includes equipment operatively coupled to one or more networks (e.g., cable, etc.). As data are available, options exist for tasks to be performed.

Various embodiments of the present disclosure may provide systems, methods, and computer-readable storage media for the interpretation of data into reservoir characterization workflows. In certain embodiments, this approach may reduce the time spent on interpretation in reservoir characterization studies while increasing quality and productivity, while reducing cost. A reservoir characterization can be more accurate when utilizing one or more automated interpretation techniques.

Stratigraphy involves the study of the history, composition, relative ages and distribution of strata, and the interpretation of strata to elucidate Earth history for one or more purposes. The comparison, or correlation, of separated strata can include study of their lithology, fossil content, and relative or absolute age, or lithostratigraphy, biostratigraphy, and chronostratigraphy.

Rocks that were formed during the periods of geologic time can be called systems and bear the same names as those of the periods. Hence, rocks of the Permian System were deposited during Permian time or in the Permian Period; rocks of the Cambrian System were formed during the Cambrian Period, etc. It can be useful to assign rocks to smaller divisions. Rocks that are placed within a major division of a system are said to constitute a series, which may be called lower, middle, upper, or which may be given a geographic name. In parts of the geologic section, nomenclature can be utilized to assign strata to still smaller divisions, and hence stages can be used as smaller and/or more local divisions within a series.

A rock-stratigraphic unit or simply stratigraphic unit is a subdivision of rocks that can be delimited on the basis of lithologic characteristics. Rock-stratigraphic units can be divided into groups, formations, members, and beds. A formation is the fundamental unit in this division. A group is the next higher ranking unit and may include two or more formations. A member is a subdivision of a formation. A bed tends to be used as the smallest subdivision in rock-stratigraphic classification.

As to some examples of terms that can be utilized in assessing stratigraphy, consider true vertical thickness, which is the thickness of a bed or rock body measured vertically at a point. As an example, values of true vertical thickness in an area can be plotted and contours drawn to create an isochore map. Another term is true stratigraphic thickness, which is the thickness of a bed or rock body after adjusting for the dip of the bed or body and, for example, deviation of a well that penetrates it. The values of true stratigraphic thickness in an area can be plotted and contours drawn to create an isopach map. An isopach map is a contour map that can connect points of approximately equal thickness. For example, in such a map, isopachs or contours that make up an isopach map can be rendered to a display to show the stratigraphic thickness of a rock unit (e.g., as opposed to the true vertical thickness). Isopachs can be defined as showing the true stratigraphic thicknesses such as the thickness perpendicular to bedding surfaces.

Figure 8:
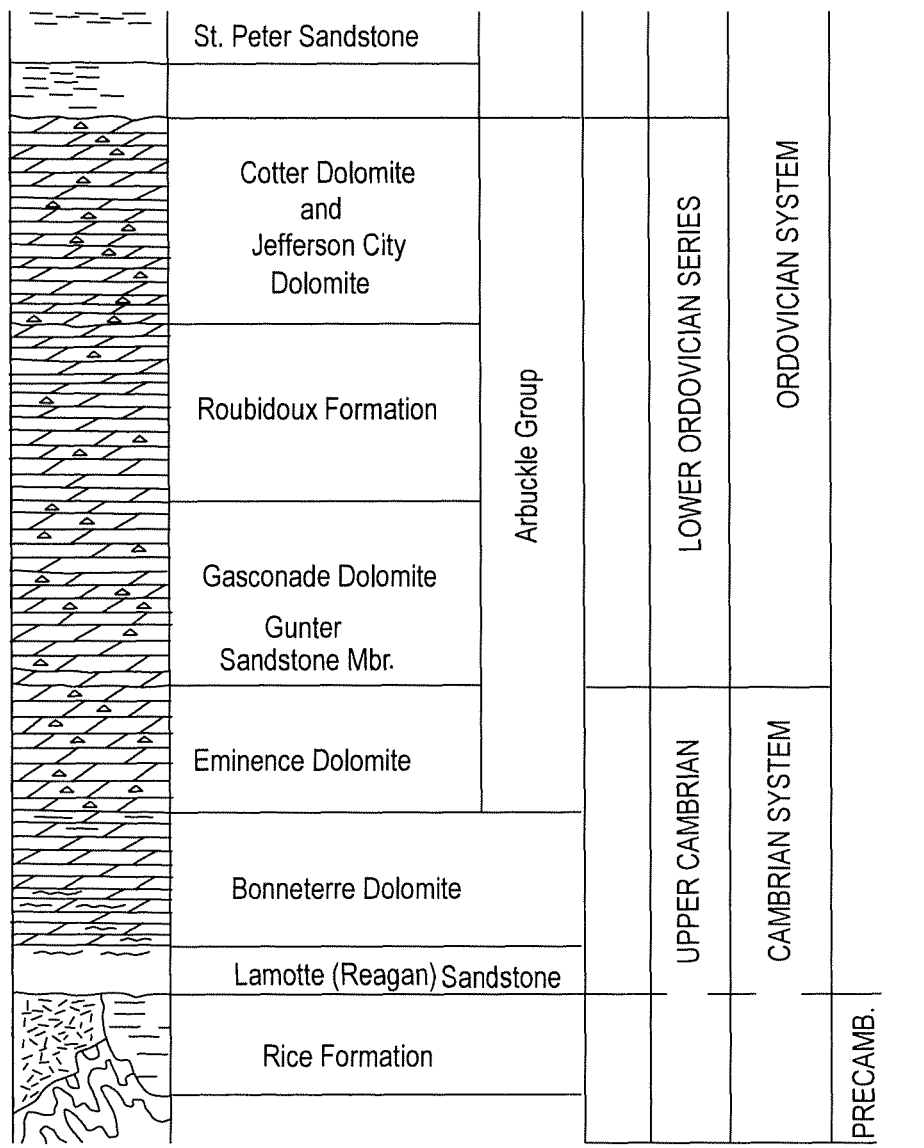
FIG. 8 illustrates an example of stratigraphy.

FIG. 8 shows an example of a stratigraphic chart that includes the Arbuckle Group, which is within the Ordovician geologic period and system, being the second of six periods of the Paleozoic Era. The Ordovician spans 41.2 million years from the end of the Cambrian Period 485.4 million years ago (Mya) to the start of the Silurian Period 443.8 Mya.

The Arbuckle Group and equivalent-age rocks (Cambrian and Lower Ordovician) represent a notable record of sediment deposition in the history of the North American continent and they contain substantial accumulations of hydrocarbons (oil and gas) and base metal deposits. Arbuckle rocks thicken from north to south and are up to approximately 660 m (e.g., approximately 1,390 feet) in the southeastern corner of Kansas. Arbuckle Group and equivalent-age rocks from Kansas and surrounding areas are similar, including platform deposits dominated by ramp-type subtidal to peritidal carbonates (mostly dolomitized) which can be subdivided into cycles, less than approximately 0.5 m to approximately 40 m thick, for example, based on facies type and depositional patterns. Depositional facies can include, for example, coarse-grained packstones/grainstones, fine-grained packstones/wackestones/mudstones, stromatolites-thrombolites, intraclastic conglomerate and breccia, and shale. Secondary features can include dolomitization, breccia, fracture, and conglomerate related to early subaerial exposure and later karst, burial or structural processes, silicification, and local mineralization.

Arbuckle and equivalent strata in the Midcontinent were affected by prolonged subaerial exposure that began immediately after Arbuckle deposition, forming the sub-Tippecanoe to sub-Absaroka unconformity. Favorable reservoir characteristics can be related to basement structural elements and karstic features from the post-Arbuckle subaerial exposure event.

Although most hydrocarbon production in Kansas is from the top of the Arbuckle, the Arbuckle may not be a simple homogeneous reservoir as evidence indicates complex vertical and lateral heterogeneities exist including both nonporous and porous horizons in the formation, and that a high probability exists of locating additional oil with improved reservoir characterization.

Although fracture and vuggy porosity contribute to the production of Arbuckle strata, data indicate a substantial amount of porosity (e.g., about 50%) in some cores is controlled by depositional facies and dolomitization. Studies of Arbuckle and equivalent-age strata from other areas indicate that Arbuckle strata and diagenetic processes are complex and that porosity/permeability patterns are related to a number of processes.

Reservoir characterization through seismic surveys and other data acquisition techniques can provide for improved reservoir characterization. Characterization can include, for example, sedimentologic, stratigraphic, and sequence stratigraphic analyses incorporating core, well log, and seismic data; petrophysical studies; regional and local structural analyses and mapping of details on the contribution of structural features and karst paleogeomorphology to reservoir character; and diagenetic and geochemical studies, for example, focusing on timing of, and processes associated with, dolomitization and karstification events and their contributions to creating or occluding porosity.

As mentioned, for the example stratigraphy 800 of FIG. 8, thicknesses of materials in a stratigraphic unit can be of the order of 1 m or less. As mentioned, the thickness of Arbuckle Group rock can be approximately 660 m. Referring again to seismic survey parameters, given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). Such a sample spacing can provide for a resolution of seismic data and hence a seismic image.

Seismic data includes information as to reflectors. A reflector can be an interface between layers of contrasting acoustic properties. Seismic waves can be reflected at such an interface. In seismic data, a reflector might represent a change in lithology, a fault or an unconformity. A reflector can be expressed as a reflection in seismic data. As an example, a seismic survey can have an associated acquisition geometry and acquisition parameters that can determine resolution. Where samples of seismic energy as acquired by one or more seismic energy sensors (e.g., receivers) provide for a depth spacing of about 10 m, a reflector may be interpreted to have a position as to depth that is accurate to within approximately 10 m. As an example, a seismic survey may be configured to provide lesser or greater resolution and hence accuracy. As an example, one or more other data acquisition techniques may be employed to provide data with greater depth or other position accuracy. For example, consider one or more wireline types of techniques, which may be able to provide resolution on the scale of less than 10 m (e.g., optionally sub-meter accuracy as to position).

In various examples, one or more systems, methods, or computer-readable storage media (CRM) are presented that can provide for performing one or more tasks associated with a workflow or workflows that include stratigraphic analysis where, for example, a workflow can include digital image processing and image rendering and/or can include issuing one or more signals to one or more pieces of equipment (e.g., consider a control signal issued via an interface that can control a piece of field equipment).

As an example, a system, a method, and/or CRM can be implemented for identifying one or more stratigraphic units using machine learning. Such an approach may involve doing segmentation of seismic sections of seismic data using deep convolutional neural networks to reduce time demand in interpreting an area of interest of the Earth.

In one or more embodiments, an approach can facilitate identifying stratigraphic units in seismic data by using supervised learning. Seismic interpretation of a new area of interest is not a trivial task and might demand several weeks of interpretation, depending on the size, quality and complexity of the seismic data. An interpreter may perform a workflow utilizing specialized software designed for manual and semi-automated interpretation to speed up the interpretation phase.

Interpretation itself depends on expertise of an interpreter, and manual interpretation has proven sufficient for characterization of subsurface regions of the Earth to aid in the production of hydrocarbons from reservoirs. However, machine learning technology can improve on manual interpretation, particularly in handling the amount of data acquired via one or more seismic surveys. Applying machine learning techniques to accurately identify stratigraphic units in seismic data can provide a substantial reduction in the amount of manual work for interpretation.

In one or more embodiments, a computational imaging framework uses deep convolutional neural networks (CNN) to detect stratigraphic units in images of seismic sections. Such an approach can allow users to gain new insight from seismic data by quickly getting an indication of which stratigraphic units are present in an area of interest. The domain knowledge of seismic interpretation experts can be implicitly captured by a neural network when it is properly trained. In other words, once the neural network has been trained, it can inherit the domain knowledge that has been put into an interpretation by an interpretation expert or experts. The inherited domain knowledge can then be applied to new seismic data, automatically, by a user, etc. As interpretation results may be generated in a lesser amount of time for an area of interest through use of ML (e.g., a trained machine, etc.), various processes may be improved. For example, seismic survey parameters may be adjusted during a seismic survey (e.g., land, marine, etc.), one or more field operations may be adjusted, optionally during a seismic survey, etc.

As an example, a method can include receiving an amount of seismic data from an ongoing seismic survey, interpreting the seismic data via an interpreter, training a ML system using the interpreted seismic data to generate a trained ML system, and applying the trained ML system to additional seismic data acquired by the ongoing seismic survey. In such an example, interpretation via the trained ML system can be performed at least in part simultaneously with a seismic survey.

While the foregoing example can involve simultaneous interpretation and surveying, a method may access seismic data from a completed seismic survey and perform the interpretation for a portion of the seismic data for training a ML system and then apply the trained ML system to one or more other portions of the seismic data.

As an example, a method can involve a local approach where, for example, training of a neural network system (NNS) is performed on a relatively small portion of a single seismic cube (volumetric seismic data) to generate a trained NNS and where the trained NNS is utilized for prediction on one or more other portions of the single seismic cube.

As an example, a method can involve a regional approach where, for example, training of a NNS on multiple similar seismic cubes (e.g. cubes from an area) is performed to generate a trained NNS and where the trained NNS is utilized for prediction on another similar cube (e.g., a newly acquired seismic cube).

As an example, a method can involve a global approach where, for example, training of a NNS or NNSs on available training data from anywhere in the world with any type of geology is performed to generate one or more trained NNSs that can be run for prediction on selected seismic data from one or more regions of the Earth.

The foregoing local, regional and global approaches may be implemented via one or more computational frameworks that can be accessed by one or more geoscientists for purposes of oil and/or gas field development and/or oil and/or gas field production.

Figure 9:
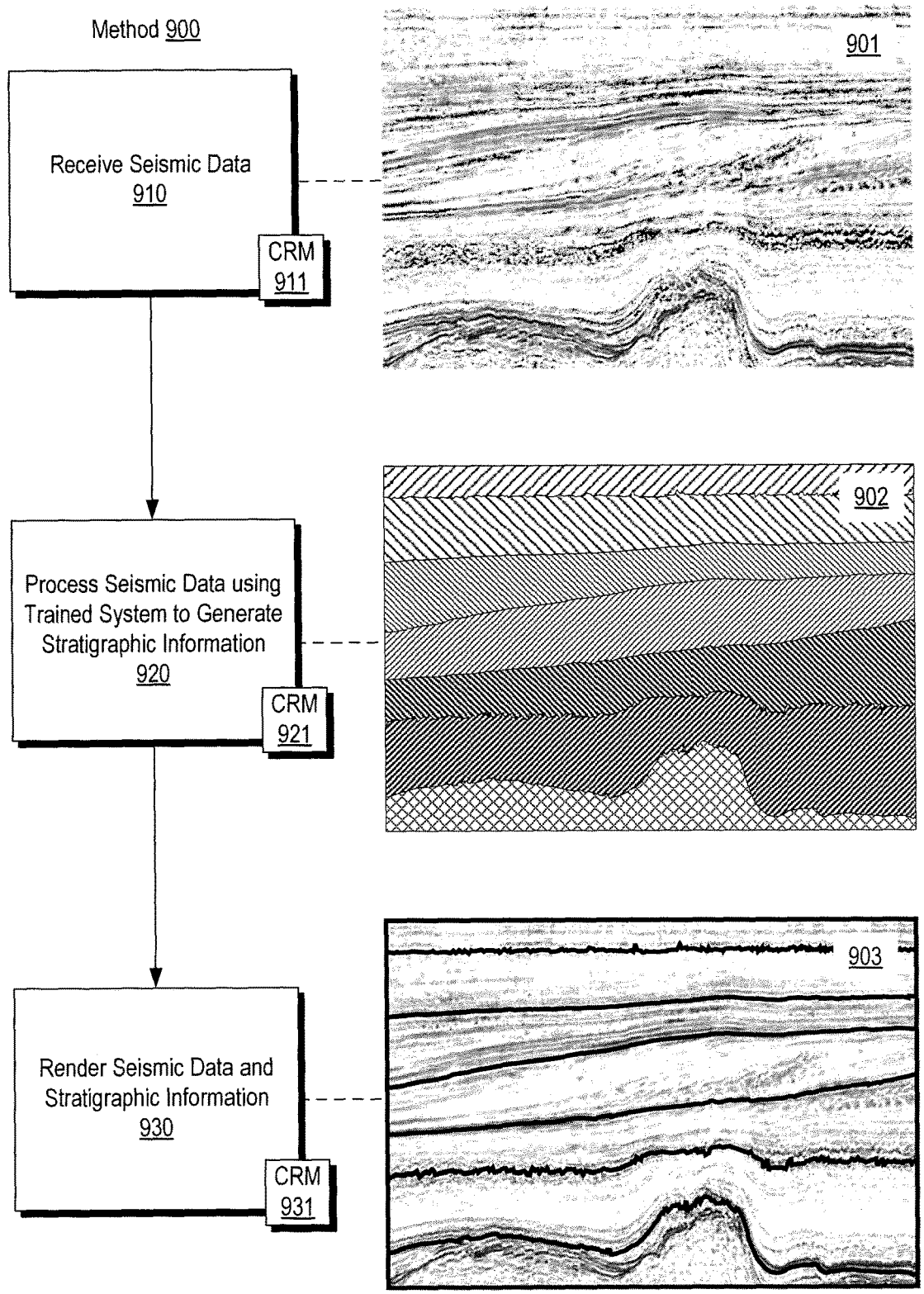
FIG. 9 illustrates an example of a method and example images.

FIG. 9 shows an example of a method 900 along with examples of a seismic image 901 (a seismic data image), generated stratigraphic information 902 (based at least in part on the seismic data image), and an improved seismic image 903 that includes the generated stratigraphic information 902.

In the example of FIG. 9, the method 900 includes a reception block 910 for receiving the seismic data of the seismic image 901, a process block 920 for processing the seismic data of the seismic image 901 using a trained system to generate the stratigraphic information 902, and a render block 930 for rendering the improved seismic image 903 of the received seismic data and the generated stratigraphic information.

As shown in the example of FIG. 9, the stratigraphic information 902 shows how layers of material (e.g., rock) can be segmented stratigraphically, for example, as seven (7) stratigraphic units. In the example of FIG. 9, the seven stratigraphic units exist along the entire span of the region shown with each unit being characterized at least in part by a maximum depth and a minimum depth where depth thickness (e.g., true vertical depth) varies for each unit over the span.

The seismic image 901 is an image that is based on seismic data with respect to depth (e.g., a depth range) and a horizontal dimension (e.g., a lateral span), which may be, for example, an inline direction, a crossline direction or another direction or dimension.

As an example, a horizontal dimension may be zig-zagged, curved, etc., as appearing in a plan view of a region of the Earth. For example, it may be a line with an orientation (e.g., South to North) or a first line with a first orientation that joins a second line with a second orientation. As an example, multiple seismic surveys may be patched together where one or more of inline and crossline directions may be the same or may differ. As an example, a seismic survey may include an inline direction that is curved or made of two or more lines, for example, where an obstruction may exist such as a river, a coastline, a mountain, buildings, etc. As an example, a marine survey may include lines and/or curves, the latter of which may be spiral curves or curves from turns in moving from one line to another line (e.g., as may be guided by GPS navigation of a vessel, etc.). As an example, a marine survey may be an ocean bottom survey, which may employ ocean bottom streamers or nodes. As an example, a survey may employ one or more types of receivers (e.g., discrete, coupled along a string, etc.).

As mentioned, in the example of FIG. 9, the seven stratigraphic units exist along the lateral span of the seismic image 901, as shown in the improved image 903. As an example, a system may be trained using seismic data with sufficient vertical diversity, whether as to vertical diversity of a single unit or vertical diversity as to one or more units.

Figure 10:
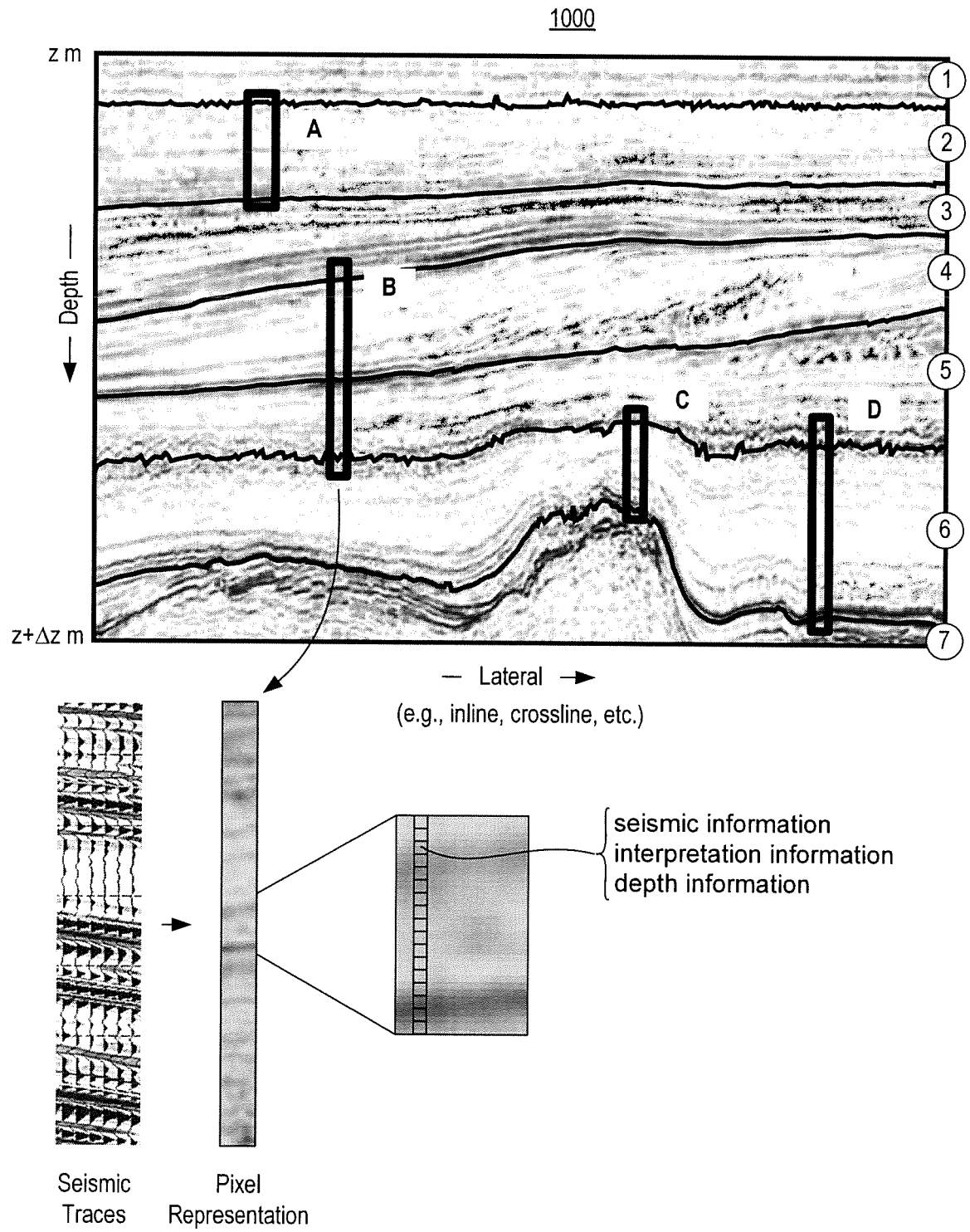
FIG. 10 illustrates an example of seismic image data and examples of windows.

FIG. 10 shows an example of a seismic image 1000 and some examples of windows of seismic data (e.g., windows or tiles of a seismic image, etc.), labeled A, B, C and D. The seismic image 1000 is rendered using seismic image data as a pixel image to a display using a computerized device or system, for example, by accessing seismic image data from a data storage device and processing the seismic image data to be pixels of a desired resolution (e.g., resolution of the display, etc.), which may be adjustable based on resolution of the seismic image date. As an example, for interpretation, selection of training data, etc., the seismic image 1000 may be zoomed in, zoomed out, etc.

As shown in FIG. 10, the seismic image 1000 can be rendered using seismic image data that can be in the form of seismic traces, illustrated approximately in a graphic that includes waveforms of amplitude with respect to depth where traces are acquired with respect to time using seismic acquisition equipment. A trace can be seismic data recorded for one channel where a seismic trace represents the response of an elastic wavefield to velocity and density contrasts across interfaces of layers of rock or sediments as energy travels from a source through the subsurface to a receiver or receiver array.

Amplitude can be defined as the maximum positive or negative deflection of a wave about a zero crossing. The reflection coefficient (R) can be defined as the ratio of amplitude of a reflected wave to an incident wave (e.g., how much energy is reflected). Some example values of R can be approximately −1 from water to air (e.g., water as a medium and air as a medium with an interface therebetween); approximately 0.5 from water to rock; and approximately 0.2 for shale to sand. At non-normal incidence, the reflection coefficient can be defined as a ratio of amplitudes and can depend on one or more other parameters, such as shear velocity (e.g., a function of incident angle defined by the Zoeppritz equations, etc.). As an example, one or more techniques may be utilized to determine pixel values of seismic image data. For example, consider calculating pixel values based on a grayscale (e.g., 0 to 255, 512, 1024, etc.) that ranges from maximum negative deflection to maximum positive deflection. As an example, multiple colors may be utilized for rendering a seismic image (e.g., red for negative amplitude and blue for positive amplitude).

In seismic image data acquisition as a tomographic reflection seismology process, a source transmits wave energy into subsurface. Then, the wave energy propagates and is reflected on one or more boundaries. After that, reflected wave energy propagates to a receiver or receivers (e.g., surface, etc.) and is recorded. For example, consider a receiver that records P wave energy, which includes direct wave energy, reflected wave energy, refracted wave energy and noise. In the oil and gas industry, of particular interest, may be reflected wave energy (e.g., as to one or more reflectors). A geophysicist may process recorded seismic image data in a manner that reduces amplitude effect from one or more other waves. As an example, seismic image data after processing may be classified to be post-stack seismic image data or pre-stack seismic image data. Post-stack seismic image data analyze seismic image data with zero offset amplitude, while pre-stack seismic image data analyze seismic image data with non-zero offset amplitude.

As to interpretation, a process referred to as picking may be implemented. For example, manual seismic interpretation can involve rendering a seismic image to a display and picking locations as corresponding to geologic features. Picking may be facilitated through use of a cursor navigable by a mouse, a trackball, etc., through use of a stylus, through use of a finger (e.g., on a touchscreen, a touchpad, etc.), etc. The term pick can be defined as interpreting data such as seismic sections by selecting and tracking marker beds or other events.

An event can be defined as an appearance of seismic data as a diffraction, reflection, refraction or other similar feature produced by an arrival of seismic energy. An event can be a single wiggle within a trace, or a consistent lining up of several wiggles over several traces. An event in a seismic section can represent a geologic interface, such as a fault, unconformity or change in lithology.

In picking, selecting can occur by positioning a cursor on a rendered seismic image at a particular location that is interpreted to be a point of interest (e.g., a seismic event, etc.). A user may select the point via a mouse click or another type of action or instruction (e.g., a keystroke, a depression of a stylus tip, a click of a stylus button, etc.). Once selected, information concerning the point can be saved to a storage device (e.g., a memory device operatively coupled to a computing device or system). Such information can include coordinates of the point, which may be a pixel or a voxel of a seismic image dataset, which can include associated seismic information (e.g., coordinates, amplitude, time, etc.). As an example, a series of selections can be associated with a particular structural feature of a subsurface region. Thus, for example, interpretation of a bed (e.g., a reflector) via picking can generate a series of points that are believed to be associated with the bed.

In the example of FIG. 10, a series of vertical elements such as, for example, pixels, etc., are illustrated where at least some of the elements include associated information, which can include information for purposes of training a machine model. As shown, such information can include seismic information (e.g., information of a seismic signal or signals and/or derived from a seismic signal or signals), interpretation information (e.g., a classification or other characterization of what type of material, feature, etc., is at a location), and depth information (e.g., information as to the depth of the location with respect to a reference location). As an example, one or more other types of information may be included such as, for example, seismic acquisition information, seismic attribute information, field, etc.

As to depth, a scale is shown in FIG. 10 ranging from z meters to z+Δz meters. In such an example, z meters can be based on a reference location, which may be, for example, the surface of the Earth. As mentioned, time may be a proxy for depth (e.g., traveltime, etc.). In the example of FIG. 10, various windows (e.g., tiles) may be depth referenced with respect to a common reference location.

As an example, a workflow can include picking as to seismic data or other data or a combination of seismic data and other data. For example, a workflow can include correlation of seismic picks to geologic picks, such as formation tops interpreted from well logs, which may help to improve interpretations.

As shown, each of the windows has a depth dimension that exceeds a width dimension and each of the windows includes an amount of depth diversity or vertical diversity. As to the window A, it spans the second unit with respect to depth. As to the window B, it spans the fourth and fifth units with respect to depth. As to the window C, it spans the sixth unit with respect to depth. As to the window D, it spans the sixth unit with respect to depth, noting that the stratigraphy of the window C and the stratigraphy of the window D share commonalities while being of different depth spans. As to training a NNS, training data that includes diversity can be diversity with respect to how compacted or expanded material is within a unit. In such an approach, a NNS can be trained to recognize (e.g., identify) a unit regardless of how compacted or expanded it may be. As an example, an interpreter may identify manually a region where a unit varies in its thickness with respect to depth to provide adequate training data as to depth thickness diversity, as a particular type of diversity. Such data may inform a NNS that a unit can appear compacted or expanded yet be the same unit.

As to an example of a NNS, consider a "U" architecture NNS such as, for example, the U-Net architecture NNS. The U-Net can be applied as part of a deep network training method where annotated (e.g., labeled) training samples are utilized to train an NNS. The U-Net is a network and training strategy that can be implemented with use of data augmentation to use available annotated samples more efficiently (e.g., to generate additional training data). The U-Net architecture includes of a contracting path to capture context and a symmetric expanding path that enables precise localization. In an article by Ronneberger et al., entitled "U-Net: Convolutional Networks for Biomedical Image Segmentation" light microscopy images of biological cells (phase contrast and differential interference contrast or DIC) were utilized to train a network end-to-end in a manner that outperformed a sliding-window convolutional network method as to neuronal biological cells in electron microscopic stacks. Ronneberger et al. utilized the trained network for segmentation of biological cell boundaries in 512×512 pixel images where a single image took less than a second to process on a computer graphics processing unit (GPU). The article by Ronneberger et al., entitled "U-Net: Convolutional Networks for Biomedical Image Segmentation", The Medical Image Computing and Computer-Assisted Intervention (MICCAI), Springer, LNCS, Vol. 9351: 234-241, 2015, available at arXiv:1505.04597, is incorporated by reference herein.

As an example, a method can include implementing a fully convolutional network. Such a method can include supplementing a contracting network with successive layers where, for example, pooling operators may be replaced by upsampling operators, which can increase the resolution of the output.

As an example, a method can include localizing by combining high resolution features from a contracting path with upsampled output. In such an example, a successive convolution layer can learn to assemble a more precise output based on such information.

As to a "U" shape architecture, an expansive path can be more or less symmetric to a contracting path to yield a "U" shape. A network can be without fully connected layers and can utilize the valid part of each convolution, for example, where a segmentation map includes the pixels for which the full context is available in the corresponding input image. Such an approach can facilitate the seamless segmentation of arbitrarily large images by an overlap-tile strategy.

As an example, a method can include one or more actions that can handle border regions of a seismic image. For example, a method can be implemented that utilizes a limit as to a number of seismic data samples from a border or, for example, a distance from a border (e.g., in terms of meters, etc.). Such an approach can help to reduce artefacts that may exist as to where data "ends". As an example, one or more extrapolation techniques may be applied at a border or a suitable distance from a border to reduce artefacts.

As an example, with respect to tiling, one or more parameters may be selected or otherwise determined, optionally at the time of interpretation of seismic data. For example, consider the example of FIG. 10 as to windows A, B, C and D being tile windows or tiles.

As mentioned with respect to FIG. 10, a unit may be compacted or expanded. As an example, a method can include selecting a tile and compacting the tile and/or expanding the tile to generate additional or augmented training data. For example, consider compacting the window D and expanding the window C. As an example, compacting and/or expanding may be based at least in part on an estimated average unit thickness. For example, consider the seventh unit and calculating a number of thicknesses and then determining a minimum thickness, a maximum thickness and an average thickness. Such thickness information can be utilized in augmenting training data (e.g., generating additional training data) for a unit. As an example, a method can include determining one or more types of thicknesses (e.g., true vertical, stratigraphic, etc.) and utilizing such information to generate additional training data. As an example, thicknesses may be analyzed statistically to provide a statistical distribution of thicknesses and, for example, optionally information as to changes in thickness of a unit with respect to a lateral dimension. As mentioned, thickness information can be a type of diversity information that can enhance training of a NNS such that the NNS is more accurate as to identifying stratigraphic units in seismic data (e.g., seismic image data).

As an example, a method can include training a NNS using training data that includes diversity as to stratigraphy and as to span, the latter of which may be from selection of different spans and/or from generation of different spans via compaction and/or expansion. In applying a trained NNS to seismic data, uniqueness can exist for individual regions of the seismic data. Seismic properties of materials can different depending on factors such as porosity, fluid content, stress, etc., which can be local factors. As may be appreciated, for analysis of seismic data, recognition via a trained NNS involves more than simple recognition of directly imaged "objects" of a single class as in light microscopy of a single type of biological cell.

Figure 11:
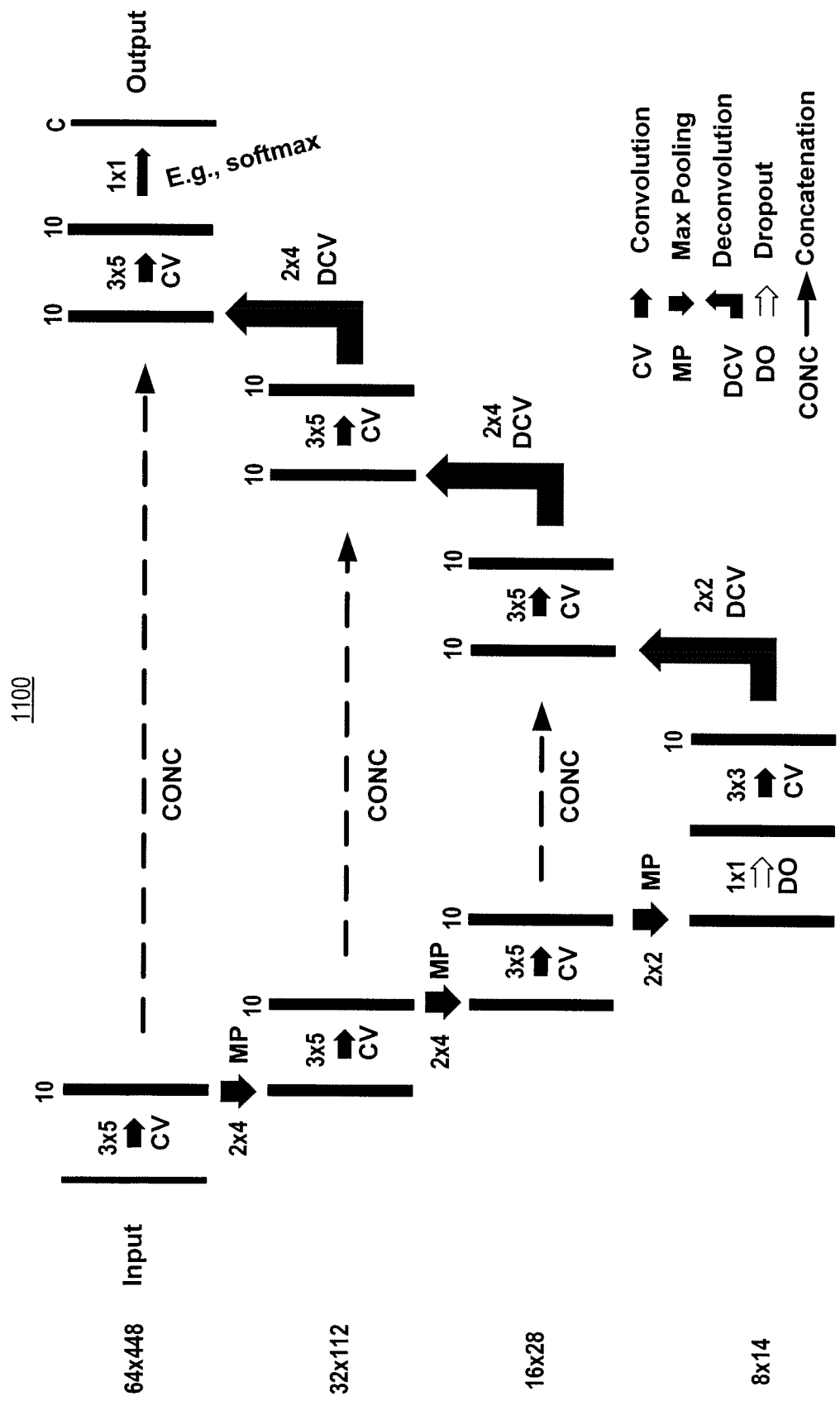
FIG. 11 illustrates an example of a convolution neural network.

FIG. 11 shows an example of an architecture 1100 that includes a "U" shape, which is due to a contraction downwardly that generally aims to increase what and reduce where and an expansion upwardly that aims to generate a high resolution map. In the example of FIG. 11, a number of feature channels is specified, which is shown to be ten (10); noting that fewer or greater feature channels may be utilized.

FIG. 11 shows various dimensions of data as they are processed through the architecture 1100. For example, input data of a seismic image can be of a tile size of approximately 64 in lateral span and 448 in depth span (e.g., depth range). Such data can be processed via convolution (CV) and max pooling (MP) to be 32×112 and then 16×28 and then 8×14. Following such contractions, deconvolution (DCV) can be applied to generate a desired resolution map and ultimately an output image (e.g., stratigraphic information for an improved seismic image), noting that concatenation (CONC) operations along with convolution (CV) operations are performed at three levels in the example of FIG. 11.

Convolution neural networks (CNN) can be described as being a continuation of what may be referred to as multiple layer perceptron (MLP). In an MLP, a core performs simple computations by taking the weighted sum of other cores that serve as input to it. The network may be structured into different layers of cores, where each core in a layer is connected to the other cores in the previous layers. As an example, a CNN architecture can include four kinds of layers: convolutional (conv or CV), rectifying linear unit (ReLU), pooling (pool), and fully connected layer (fcLayer). Each convolutional layer transforms a set of feature maps to another set of feature maps using a convolution operation $\otimes$ based on a set of filters.

Mathematically, if $W_i^l$ and $b_i^l$ respectively denote the weight matrix and the bias vector of the $i^{th}$ filter of the $l^{th}$ convolutional layer and $M_i^l$ its activation map:

$$M_i^l = M^{l-1} \otimes W_i^l + b_i^l$$

ReLU is the activation function, for the $i^{th}$ unit of layer l it is defined as follows:

$$M_i^l = \max(M_i^{l-1}, 0)$$

Pooling layers perform a spatial down sampling of the input feature map. Pooling can be used to decrease the input dimensionality of the next layer. It helps making the representation become invariant to small translations of the input.

After several convolutional and pooling layers, the high-level reasoning in the neural network is accomplished via fully connected layers (fcLayer). As an example, let $W^l$ denote the incoming weight matrix and $b^l$ the bias vector of a fully connected layer l then:

$$M^l = h \text{ tile}(M^{l-1}) * W^l \oplus b^l$$

Where htile(.) operator tiles the feature-maps of the input volume along the height, * is matrix multiplication and $\oplus$ is elementwise addition.

As to dropout, it can be a regularization method for neural networks that can help to diminish overfitting by a CNN. For example, a technique as in an article by Srivastava et al., entitled "Dropout: A simple way to prevent neural networks from over fitting", Journal of Machine Learning Research, vol. 15, pp. 1929-1958, 2014, which is incorporated by reference herein, may be applied.

As to Local Response Normalization (LRN), a layer as described in the article by Ronneberg et al. may be applied as when dealing with ReLU neurons of a CNN. Since ReLU functions have unbounded activations, LRN can normalize that behavior. Such an approach provides for detection of high frequency features with a large response.

As an example, a convolution neural network system (CNNS) can implement one or more frameworks such as, for example, a computational framework that includes neural network features. As an example, a computational framework can include an analysis engine that can include one or more features of the TENSORFLOW (Google, Mountain View, Calif.) framework, which includes a software library for dataflow programming that provides for symbolic mathematics, which may be utilized for machine learning applications such as artificial neural networks (ANNs), etc.

As an example, the CAFFE framework (Berkeley AI Research, Berkeley, Calif.) may be utilized. The CAFFE framework includes models and optimization defined by configuration where switching between CPU and GPU setting can be achieved via a single flag to train on a GPU machine then deploy to clusters. An implementation of CAFFE can process over 60M images in 24 hours with a single NVIDIA K40 GPU (Nvidia Corporation, Santa Clara, Calif.), which equates to approximately 1 ms/image for inference and 4 ms/image for learning.

Figure 12:
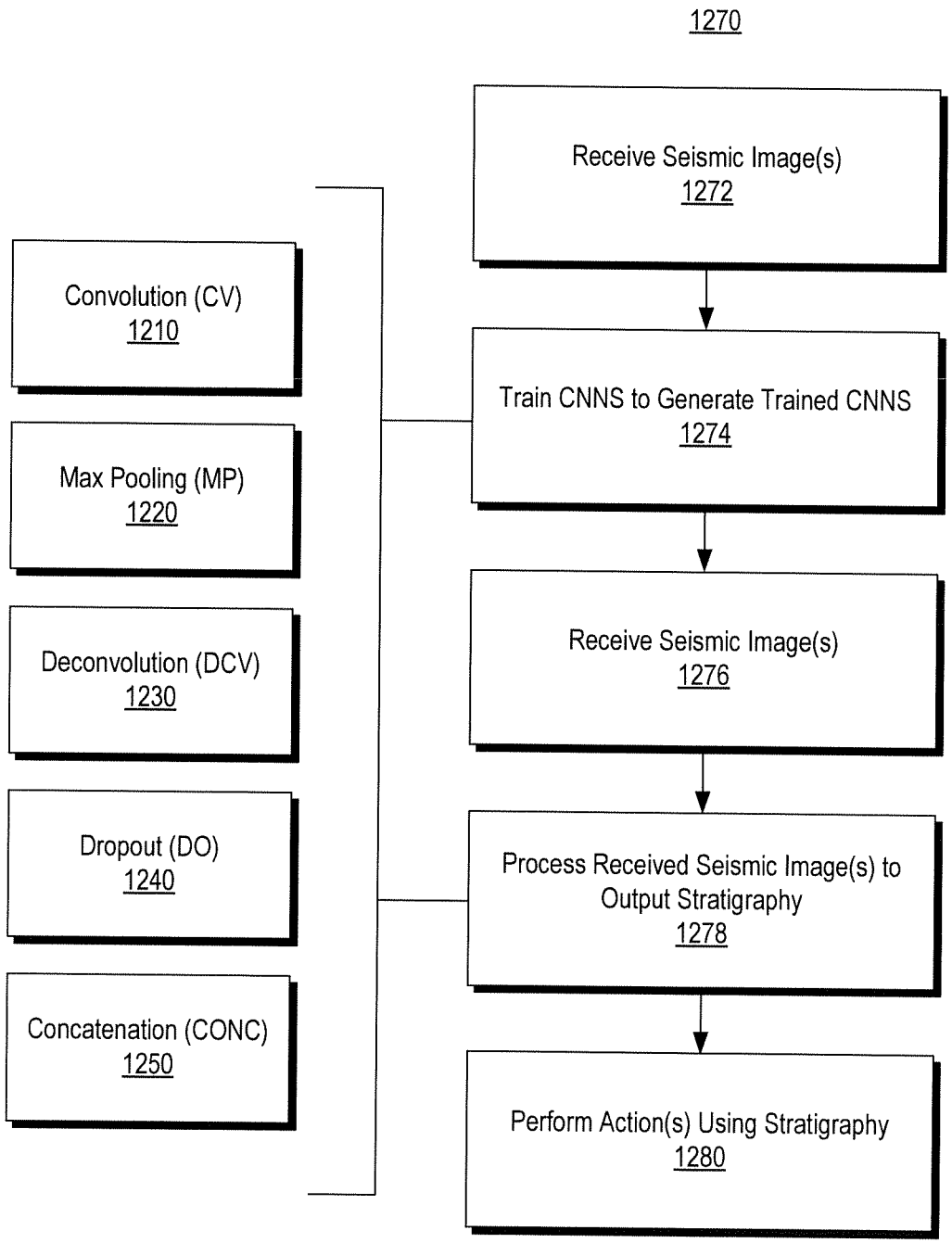
FIG. 12 illustrates examples of components of an example of a convolution neural network and an example of a method.

FIG. 12 shows example blocks 1210, 1220, 1230, 1240 and 1250 that can be part of a system such as a NNS, which may be a convolution neural network system (CNNS). In the example of FIG. 12, the block 1210 provides for convolution, the block 1220 provides for pooling, the block 1230 provides for deconvolution or "up-convolution", as a type of upsampling, the block 1240 provides for dropout, and the block 1250 provides for concatenation.

FIG. 12 also shows an example of a method 1270 that can utilize the blocks 1210, 1220, 1230, 1240 and 1250 as part of a CNNS. As shown, the method 1270 includes a reception block 1272 for receiving a seismic image(s), a training block 1274 for training a CNNS to generate a trained CNNS, a reception block 1276 for receiving a seismic image(s) to be processed, a process block 1278 for processing the received seismic image(s) to output stratigraphy, and a performance block 1280 for performing an action(s) using the stratigraphy. In such an example, the action can be an action for drilling a well. For example, a trajectory of a well can be determined and followed via drilling using the stratigraphy.

As an example, the method 1270 can include selecting one or more channels and selecting one or more tile sizes as parameters of an implementation of a CNNS that can output stratigraphy such as stratigraphic units. In such an example, the channels can include a depth channel and a tile size can include a tile that has a dimension that is greater in depth than a lateral dimension. For example, FIG. 11 shows a size of approximately 64×488 as input where 64 is a lateral dimension and 488 is a depth dimension. As mentioned, seismic data (seismic image data) can be defined by a resolution association with survey parameters such as spacing of receivers and sampling rate of receivers. Where a resolution of seismic data equates to approximately 10 meters per sample, the depth span of the aforementioned tile size (e.g., window) can be about 4,880 meters. Where a resolution of seismic data equates to approximate 1 meter per sample, the depth span of the aforementioned tile size (e.g., window) can be about 488 meters. As an example, a tile size (e.g., window) can have a depth span of approximately 10 meters to approximately 10,000 meters and can have a lateral span that is less than the depth span. As an example, a tile size can be defined to be vertical (depthwise) and/or narrow (depthwise).

As to the concept of depth as in depth of a reflector as a geologic feature in the Earth, for example, as measured from the surface of the Earth, it is not a pixel image feature. For example, the concept of depth in the Earth does not apply to images taken at the surface of the Earth. Seismic image data includes information such as traveltime information, which can be a proxy for depth in the Earth as measured from a surface of the Earth where a source and/or a receiver is positioned at the surface of the Earth (e.g., land, marine, etc.). Traveltime is the duration of the passage of a signal from the source through the Earth and back to the receiver. As an example, a time seismic section can show the two-way traveltime of the wave. As an example, a depth channel can be a vertical depth such as a true vertical depth or, for example, a time depth such as a traveltime proxy for depth (e.g., which may optionally be implemented with appropriate compensation as to "ways" such as compensating for two-way by division by two, etc.). As an example, a depth channel can be based on a location such as the surface of the Earth that is not in a seismic image. In such an example, the depth channel is based in part on a location that is not a location in a seismic image. As an example, a depth channel can be based on a depth scale that can be applied to multiple images, which can be multiple slices of a seismic image data cube or multiple tiles of a single slice. A depth channel can include information that helps to reference multiple images to a common criterion such as, for example, the surface of the Earth. As an example, the common criterion can be a known criterion that is not determined by a trained machine model but rather utilized to cross-reference or tie together training data to train the machine model and/or to cross-reference or tie together seismic image data to be processed by a trained machine model, which can include seismic image data from one or more seismic surveys.

A depth channel can also provide for physical information as to stratigraphy. For example, consider physical compaction of material, which is a physical process by which sediments are consolidated, resulting in the reduction of pore space as grains are packed closer together. As layers of sediment accumulate, the ever increasing overburden pressure during burial can cause compaction of the sediments, loss of pore fluids and formation of rock as grains are welded or cemented together.

As an example, formation compaction can provide drive pressure to produce hydrocarbons. As an example, it can also create problems in the formation and, for example, at wells in both producing and overlying formations. At the surface, subsidence can lead to flooding in low-lying areas and platform safety problems offshore. Where production from a reservoir occurs, various operations may be performed to monitor and control compaction and subsidence and mitigate various effects in one or more types of fields (e.g., the North Sea, The Netherlands, the Gulf of Mexico, the United States, etc.).

As explained, a depth channel can include information that has physical meaning beyond distance from a location such as the surface of the Earth. As an example, a depth channel can provide information germane to compaction of material, which can be evidenced in seismic image data (e.g., seismic traces of amplitude versus time or amplitude versus depth). For one or more reasons, inclusion of a depth channel can improve training of a machine model, improve a trained machine model, improve performance of a trained machine model, improve output of a trained machine model, etc.

Referring to the Arbuckle Group example of FIG. 8, material is shown to include dolomite and cherty limestone, as well as unconformities. Cherty refers to material containing chert, a sedimentary rock and a variety of quartz made of extremely fine-grained, or cryptocrystalline, silica, also called chalcedony. The silica might be of organic origin, such as from the internal structures of sponges called spicules, or inorganic origin, such as precipitation from solution. The latter results in the formation of flint. Chert can form beds and can be present as nodules in carbonate rocks. Chert can form from deposition and compaction of silica-rich skeletons of diatoms, radiolarians, and tiny sponge fragments (called spicules). Compaction can depend on overburden, which can be defined as rock overlying an area or point of interest in the subsurface. A depth channel can include information associated with overburden, which can thereby be associated with compaction, which can thereby be associated with lithology and material properties that can affect seismic energy, as evidenced in seismic image data. As such, a depth channel can provide spatial information as to location as well as additional information as to one or more characteristics of material at its depth.

Referring again to the Arbuckle Group, it is known to vary in depth and thickness across the State of Kansas, for example, as to depth, Arbuckle strata are within about 150 meters (e.g., about 500 ft) of the surface in the southeastern portion of the state and the depth to the top increases westward to more than 1800 meters (e.g., about 6,000 ft) below the present surface. As to depth of a particular stratigraphic feature or features within a seismic image, a region covered by a seismic survey may be over a region of strata that can be expected to be within a reasonable depth range (see, e.g., images of FIGS. 9, 10 and 13). As may be appreciated, overburden can vary for a stratigraphic unit(s), however, substantial variations tend to be over distances that exceed those of a single seismic survey. Regardless of such variations, depth information can still provide information relevant to material properties of a layer or layers, particularly within a seismic image from a single seismic survey or a number of seismic surveys, which may have a reasonable amount of variation in depth as to a stratigraphic unit or units of interest. As explained, seismic image data interpretation tends to be utilized in the context of exploration and production of fluid from a reservoir via drilling of one or more wells. As a well tends to be of a limited length, which may be of the order of thousands of meters, the seismic image data of interest may be similarly limited to a region that may accommodate one or more relatively closely spaced wells.

As an example of a very long well, consider the BD-04-A well, with a total length of about 12,000 meters (e.g., about 40,320 ft) in measured depth from rotary table (MDRT), as completed in May 2008 in the Al-Shaheen offshore oil field off the coast of Qatar, which includes a horizontal section measuring about 11,000 meters (e.g., about 35,770 ft) MDRT. A deep vertical well can be defined as being about 4,500 meters in true vertical depth. As may be appreciated, wells can be within a range of hundreds of meters to thousands of meters.

As an example, the block 1210 can provide for convolution and ReLU, where convolution is followed by application of an activation function (e.g., ReLU(x), etc.). As an example, a convolution may be specified as to including multiple channels and dimensions where dimension may be reduced. For example, consider a 3×3 convolution as to pixels input where a 1-pixel border is discarded in generating output, which may be for a single channel. As to an activation function, it may be linear or nonlinear. As to a rectifier, it is an activation function, which can be defined as the positive part of its argument.

As an example, the block 1220 can provide for max pooling, which may act on each of the channels separately. Such a block can take one channel of an input feature map and output one channel of an output feature map where, for example, the resulting feature map can have a factor X lower spatial resolution (e.g., where X may be 2 or other suitable amount). For example, consider a 2×2 pixel area being reduced to a 1 pixel area.

As an example, the block 1230 can provide for up-convolution and ReLU where up-convolution is followed by application of an activation function (e.g., ReLU, etc.). As an example, per the block 1230, an input feature map for multiple channels may be output to a feature map for a single channel where a first pixel area may be expanded to a second, greater pixel area such that the resulting feature maps has a factor Y higher resolution (e.g., where Y may be 2 or other suitable amount). For example, consider a 1 pixel area being upsampled to a 2×2 pixel area. The block 1230 can utilize a learned kernel for performing the up-convolution operation, for example, to map each feature vector to an output window, followed by application of an activation function.

As an example, a CNNS can include blocks that provide for convolutions, rectified linearizations (e.g., ReLUs), max poolings, up-convolutions, concatenations and dropouts.

Training of a CNNS to generate a trained CNNS involves determining values of weights (e.g., consider backpropagation, etc.). As an example, a trained CNNS can include various parameters with values determined through training. As an example, a trained CNNS can include an associated data structure or data structures that include information that has been generated via training.

As an example, training can include initialization of weights, which can be tailored such that parts of a network do not give excessive activations, while other parts of the network do not contribute. Initial weights may be adapted such that each feature map in the network has approximately unit variance. For a network with a "U" shaped architecture (e.g., alternating convolution and ReLU layers), this may be achieved by drawing the initial weights from a Gaussian distribution with a standard deviation of SQRT(2/N), where N denotes the number of incoming nodes of one neuron. For example, for a 3×3 convolution and 64 feature channels in a previous layer N=9*64=576.

As mentioned, a method such as the method 1270 of FIG. 12 can implement a supervised learning framework to identify and segment stratigraphic units in seismic data. As mentioned, a neural network such as a convolution neural network (CNN) may be trained by passing in seismic sections (e.g., as tiles) along with labeled stratigraphic units (e.g., training information). Once the neural network has been trained, it can be utilized for prediction on a desired seismic section and output segmented stratigraphic units from the input seismic section.

Figure 13:
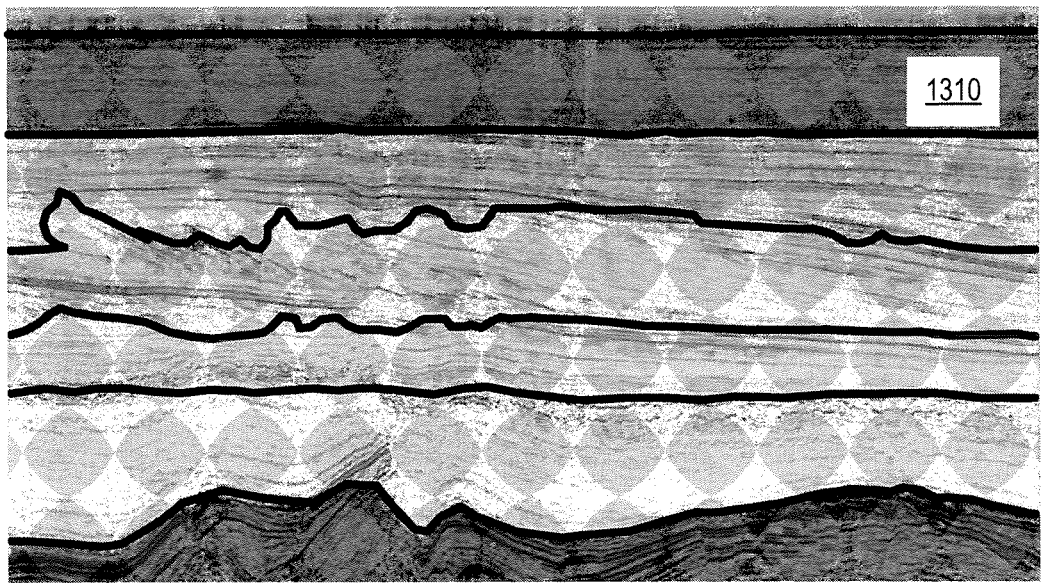
FIG. 13 illustrates examples of images.
Figure 13:
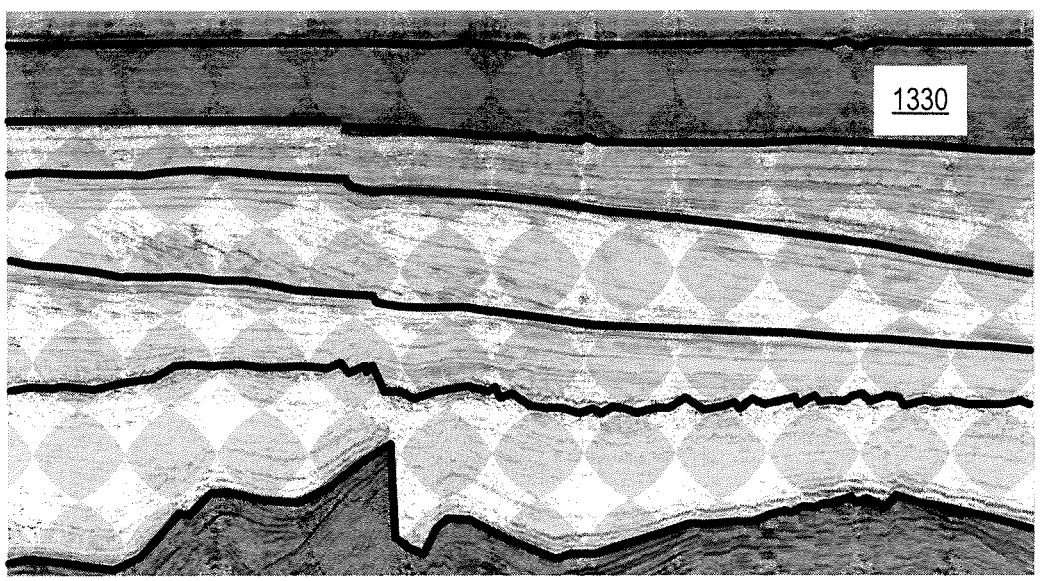

FIG. 13 shows two enhanced seismic images 1310 and 1330. The enhanced seismic image 1310 is an automatically generated seismic image from a trained convolution neural network system that has processed a seismic image while the enhanced seismic image 1330 is from a manual interpretation of the seismic image. As shown, the enhanced seismic image 1310 is enhanced without automatically identified (e.g., recognized) stratigraphic units, which include seven (7) stratigraphic units over the entire lateral span.

As an example, the enhanced seismic image 1310 can be provided to an interpreter by rendering it to a display where a graphical user interface (GUI) can allow for editing of the enhanced seismic image 1310. For example, the enhanced seismic image 1310 can be provided as a seismic image that is machine interpreted to facilitate further interpretation that may be performed manually via an interpretation framework that renders one or more graphical user interfaces to a display. As an example, a GUI can allow for selecting and dragging a boundary that is between two stratigraphic units. Such an approach can involve dragging a point downwardly in depth or upwardly in depth such that the stratigraphic boundary represents the seismic data more accurately. In such an example, the time and effort to interpret a seismic section may be decreased substantially.

As an example, during training, seismic sections and labeled stratigraphic units can be passed in as training data to a CNNS framework to generate a trained CNNS. During production to generate enhanced seismic images, seismic sections can be passed in as input to the trained CNNS, and labeled stratigraphic units can be returned as output, which enhance a seismic image. As an example, information as to stratigraphic units can be overlaid on a seismic image to allow for visualization of stratigraphic units in the seismic image as based on processing of the seismic image.

As mentioned, data augmentation for purposes of diversity can be performed, which can increase the amount of training data. As an example, data augmentation can utilize one or more techniques, such as vertical and horizontal flipping, compaction, expansion, translation, swirls at different locations in the tiles, median, and blurring.

As mentioned, a CNNS can operate using channels. For example, the FIG. 12 shows an example with 10 channels. As an example, a channel can be a depth channel, for example, a channel defined with depth information. Various example trials demonstrated that utilizing of a depth channel improved accuracy. As an example, a depth channel can include depth information where, for example, each pixel in an input seismic image tile includes information about the seismic signal, the interpretation and the depth. Such an approach improved output for stratigraphic units where tiles were selected to be vertical tiles. When compared to example trials without a depth channel, the trials without the depth channel resulted in some predictions where classes that were expected to be predicted close to the bottom of a section were predicted to be close to the top, even though this was not the case in the training data.

As an example, a system can include hardware and software that allows for access to a CNN via a web-based interface. For example, a user may access an address via a web browser application or other client application that accesses resources on one or more servers, optionally in a cloud framework (e.g., AZURE® framework, etc.). As an example, a workflow can utilize a web application where a user can upload seismic data as input, and the web application displays the results (stratigraphic units) as an overlay over the seismic image. For example, consider a tablet as a mobile computing device that can access the Internet via a network interface to access resources of a system that includes a CNN. In such an example, a user may cause the tablet to execute instructions that instruct the system to train the CNN and/or utilized a trained CNN (a trained version of the CNN).

As an example, a method can include building a training dataset. For example, a training dataset may be a portion of a seismic cube that includes sufficient diversity as to stratigraphy as in stratigraphic units that can be labeled for the purposes of training a CNN to generate a trained CNN. In such an example, the trained CNN can be utilized to process one or more other portions of the seismic cube.

As an example, a workflow can utilize a synthetic data generator to generate synthetic seismic sections along with labeled stratigraphic units. In such an example, consider a method that includes: creating a new section with random numbers between −1 and 1; smoothing the section along the horizontal axis using long filters; and creating a displacement field that describes how far each pixel in the section should be moved up or down. In such an example, the method can include applying the displacement field onto the section to shuffle the pixels around in the section. Such an approach can help simulate some geological features in the section. As an example, a method can include using a synthetic wavelet to convolve it with the section along the vertical axis (e.g., depth dimension). As an example, a method can output a training image as generated via various actions such as one or more of the aforementioned actions where the training image is a synthetic representation of seismic data with the corresponding labels as to stratigraphy. In such an example, one image can be synthetic seismic image data and the other image can be stratigraphy as understood to exist in the synthetic seismic image data. In such an example, the two images can be overlaid to show synthetic seismic image data with stratigraphic units. The two images can have the same or substantially the same size and the labels can show which stratigraphic unit is located at the corresponding pixel location in the image of the synthetic seismic data.

As an example, a method can include building a training dataset or training datasets using synthetic and/or real seismic data, optionally with one or more augmentation actions. As an example, real seismic data can be interpreted and formatted as two images, one image being a seismic image of the seismic data and the other image being labels as to stratigraphy, which can be shown as graphical labels when rendered to a display. Such two images can be overlaid such that stratigraphy can be understood visually when the merged image is rendered to a display.

Figure 14:
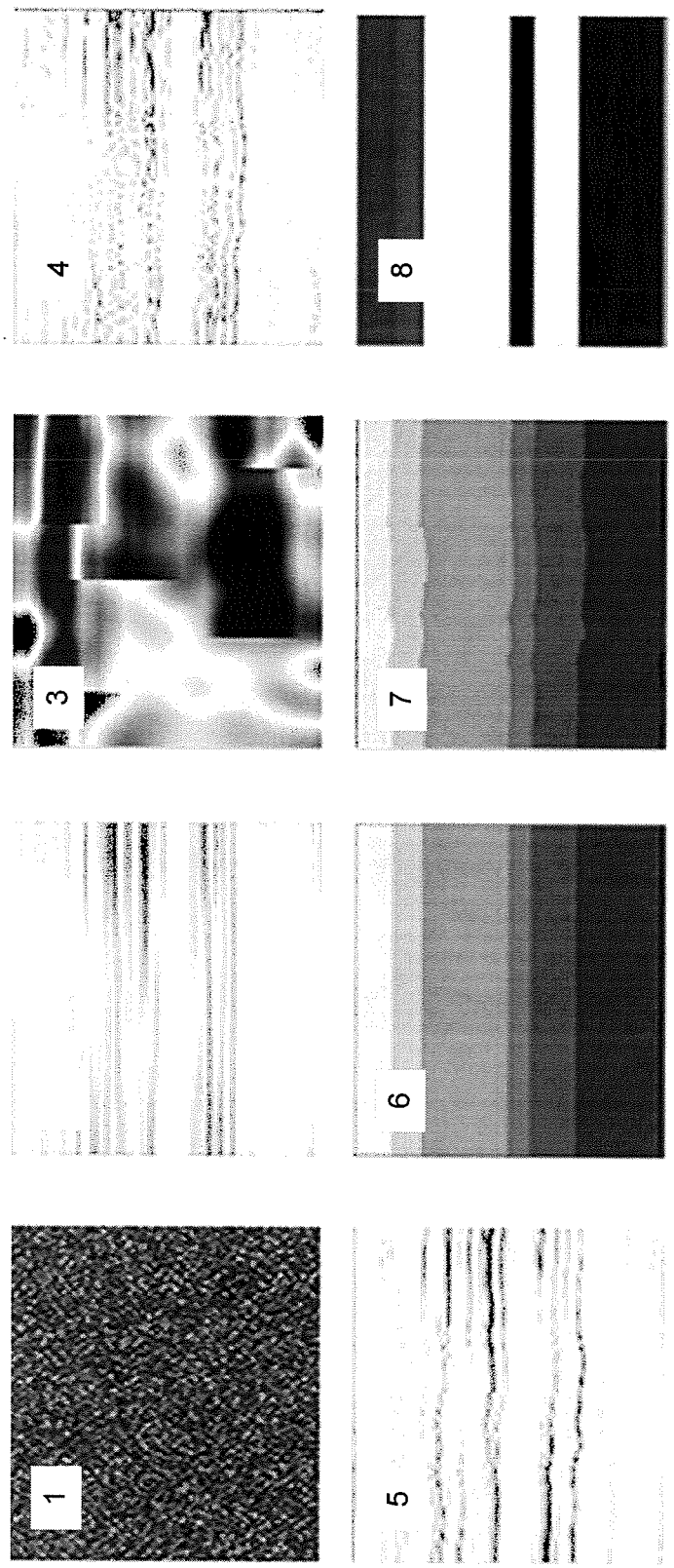
FIG. 14 illustrates examples of images.

FIG. 14 shows example images that are associated with an approach to generate synthetic data for one single section. From the top row, from left to right: (1) a new section with random numbers (e.g., random pixel values), (2) the seismic reflectors that is the result of smoothing along the horizontal axis, (3) the displacement field that simulates geology in the seismic, (4) the result of applying the displacement field onto the seismic reflectors. In the bottom row, from left to right: (5) the final seismic that is the result of convolving a wavelet with the displaced seismic reflectors, (6) the labels for the stratigraphic units, (7) the result of displacing the labels with the same displacement field that was used to displace the seismic reflectors, (8) each stratigraphic unit as assigned different seismic properties.

The approach described above can be utilized to generate training data, which can be utilized to train a machine model (e.g., CNN), which, in turn, can be used to identify stratigraphic units in seismic data and can substantially reduce the interpretation time demands to interpret an area of interest.

Figure 15:
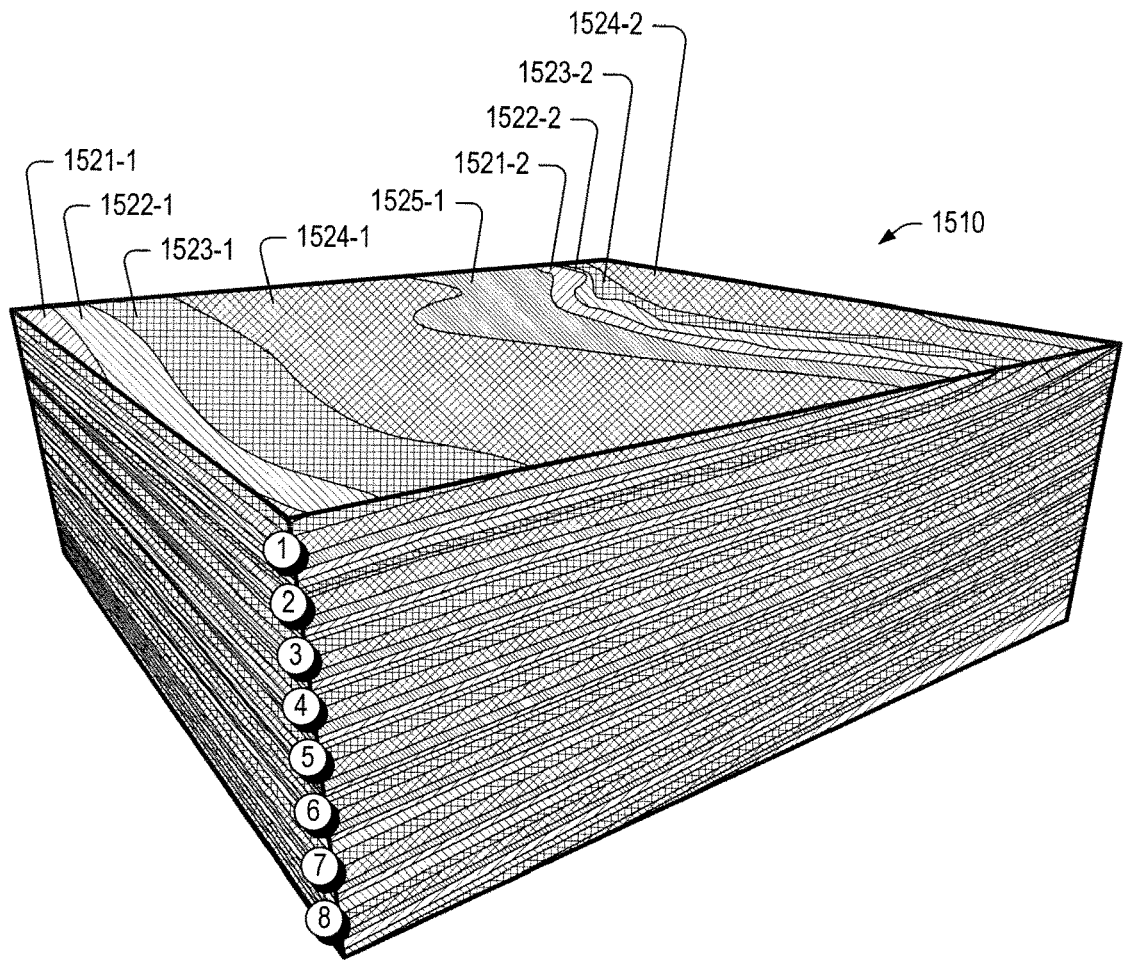
FIG. 15 illustrates an example of pre-processed seismic image data and an example of a method.
Figure 15:
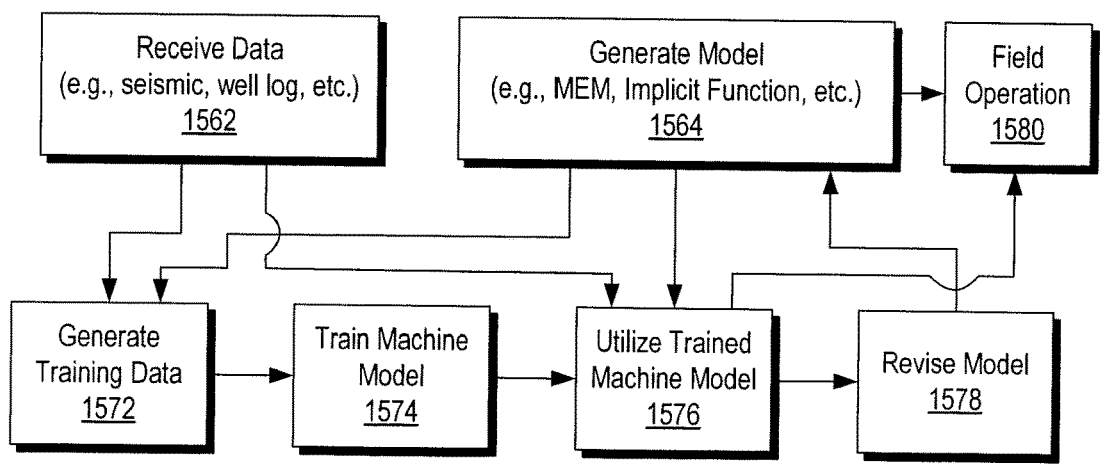

FIG. 15 shows an example of pre-processed seismic data 1510, which can be described as an implicit function model of a region of the Earth, and an example of a method 1550. The pre-processed seismic data 1510 is volumetric (e.g., from a seismic cube and optionally other data) and includes layers such as the layers labeled with 1521, 1522, 1523 and 1525 where such layers can be repeating with respect to an implicit function approach. An implicit function can be calculated for a geologic region where the values of the implicit function can represent iso-surfaces such as horizons (e.g., horizons of an implicit function model). While the values may repeat for use of an implicit function, the actual layers are distinct layers that can define one or more stratigraphic units. As an example, an implicit function can be solved for values using picked points in seismic data and/or points from well log data, which can constrain the solution. As mentioned, output from a solver can be implicit function values where the values correspond to iso-surfaces that approximate the locations of materials in the geologic region (e.g., beds, etc.). Such iso-surfaces and/or implicit function values may be utilized as or for generating labels for purposes of training a CNN to generate a trained CNN.

As an example, the pre-processed seismic data 1510 may be utilized for purposes of training and/or analysis. For example, as to analysis, the pre-processed seismic data 1510 may be utilized to formulate an initial guess as to locations of stratigraphic units in seismic data that can be processed by a trained CNN. In such an approach, the accuracy of the output of the trained CNN as to stratigraphy can be enhanced as the initial guesses may be relatively close to the actual stratigraphic boundaries (e.g., interfaces).

The method 1550 includes a reception block 1562 for receiving data such as one or more of seismic data, well log data and other data, a generation block 1564 for generating a model (e.g., or a reception block for receiving a model), a generation block 1572 for generating training data, a train block 1574 for training a machine model (e.g., a CNN, etc.), a utilization block 1576 for utilizing a trained machine model (e.g., output from the train block 1574), and a revision block 1578 for revising a model, which may be, for example, a mechanical earth model (MEM), an implicit function model, etc., of a geologic region of the Earth. The method 1550 can also include an operations block 1580 for performing one or more field operations based at least in part on output from the block 1576, which may be via a model of the block 1564, which can be a revised model per the block 1578.

As to the reception block 1562, seismic data can be seismic image data that can be tiled and labeled and optionally augmented. As mentioned, tiles can be predominately vertical or depth-wise tiles with labels that can include depth information (e.g., or travel-time information where travel-time can be a proxy for depth). As an example, a depth channel can be formulated using tiles labeled with depth information. As an example, a method can include formulating a seismic image data depth channel and a well log depth channel. As an example, a method can include formulating a depth channel that includes information as to seismic image data and well log data. As an example, training data can include seismic image data and/or well log data. As an example, a method for training a machine model can include generating labeled well log data and generating labeled seismic image data. As an example, a method can include augmenting well log data to generate additional well log data for training a machine model.

As an example, a method can include processing seismic image data using a trained machine model that is trained using seismic image data and well log data. For example, consider labeling seismic image data based at least in part on well log data where the well log data includes information as to stratigraphy and depth. In such an example, pixels of a tile of the seismic image data can be labeled with seismic information, interpretation information, depth information as associated with a seismic survey that acquired the seismic image data and well log data as to one or more of stratigraphy and depth as associated with the well logging operation that acquired the well log data. As to stratigraphy, stratigraphic information can include lithology, porosity, fluid properties where fluid may be present, etc. As to depth, depth information can include vertical depth, thickness of one or more layers of material, depth of one or more layer boundaries, etc. As an example, where well log data and seismic image data exist for a common region of the Earth, a tile of the seismic image data can be labeled at least in part using the well log data. For example, one or more reflectors (e.g., boundaries) may be labeled using depth information from a well logging operation and/or using stratigraphic information from a well logging operation. As an example, such a tile may be augmented, for example, by mirroring, etc., to generate additional training data.

As an example, a method can include labeling training data based at least in part on well log data and selectively augmenting such training data to generate additional training data. In such an approach, information acquired by a well logging operation can be amplified in amount where such information may be deemed to be more accurate to thereby generate a more accurate machine model. For example, consider a seismic survey that covers a region of the Earth that includes two wells where well logging operations (e.g., wireline, logging while drilling, measuring while drilling, etc.) have been performed to acquire well log data for each of the two wells. In such an example, seismic image data acquired via the seismic survey can be tiled where a tile that overlaps with a well can be labeled with at least a portion of the well log data. In such an example, the tile can be tagged for augmentation such that a training data set includes multiple instances of information in that tile, which may be deemed to be more accurate as it includes well log data.

As an example, well log data may be utilized to create fiducials (e.g., markers). Such fiducials may be utilized as constraints in training a machine model and/or in generating a model such as a MEM or an implicit function model. For example, a layer boundary in a MEM or an implicit function model may be tied to a well log data fiducial (e.g., marker). For example, the model 1510 can include one or more layer boundaries (e.g., as may be represented by corresponding implicit function values) that correspond to depths in well log data.

Referring again to the method 1550 of FIG. 15, such a method may be utilized to generate output as one or more stratigraphic layers that can be utilized to generate a model such as a MEM or an implicit function model and/or to revise a model such as a MEM or an implicit function model. As an example, consider processing data for a region of the Earth using a trained machine model to output stratigraphic units that are utilized as initial guesses for a solver that solves a set of equations for implicit function values that correspond to stratigraphic units of the region of the Earth. In such an example, operation of the solver can be improved as the initial guesses (e.g., initial implicit function values) may be closer to solution values than initial guesses provided via human interpretation alone, particularly where the human interpretation is for a relatively small portion of the region and/or points that may be sparsely located within the region. As an example, one or more runs of a trained machine model can provide volumetric output for volumetric stratigraphic units, which may be used, for example, for model generation and/or revision as to a MEM, an implicit function model, etc.

As an example, a method can include generating synthetic seismic data utilizing a MEM or an implicit function model where layers can be assigned properties that affect seismic energy. In such an example, seismic energy rays can be simulated as passing through the model to generate synthetic seismic image data. As an example, such synthetic seismic image data may be utilized for purposes of training a machine model to generate a trained machine model. Such data may be utilized alternatively or additionally to other data (e.g., seismic image data from a seismic survey, well log data, etc.).

As an example, a loop may be created whereby a model is iteratively revised based on output of stratigraphic units from a trained machine model and where synthetic seismic data are generated from the model and compared to actual seismic data and/or input to the trained machine model to compare stratigraphic units based on synthetic seismic data to stratigraphic units based at least in part on actual seismic data. As an example, an iterative process can terminate based on one or more termination criteria, which may be one or more error criteria. For example, where synthetic seismic data generated by a model as revised using stratigraphic units output from a trained machine model are compared to actual seismic data, one or more error criteria may pertain to depth error of one or more layer boundaries (e.g., reflectors) in the synthetic and actual seismic image data. For example, where depth error of a layer boundary is less than X meters, convergence may be assumed. As to iterations, as an example, a first iteration may utilize a first portion of actual seismic data from a seismic survey to generate stratigraphic unit output, while a second iteration may utilize a second portion, etc. Such an approach may aim to arrive at an adequate model using the least amount of actual seismic data input to a trained machine model. As to an implicit function model, at each iteration, a solver may utilize output stratigraphic units to formulate initial values, which may help to speed convergence and increase accuracy of values output by the solver; noting that the implicit function model may include one or more constraints, such as, for example, one or more constraints based on well log data (e.g., layer boundary location(s), etc.).

As an example, output from a trained machine model as to stratigraphy can be utilized for model generation and/or revision. Such a model can be more accurate as to one or more layers of material in a region of the Earth. In turn, such a model can provide more accurate guidance as to one or more field operations in the region, which may include a drilling operation that aims to drill to a layer associated with a reservoir for constructing a well to produce fluid from the reservoir. As an example, a method can include identifying a location of a reservoir in a model and drilling to the reservoir based the location.

As mentioned, a method can include generating a series of outputs of 2D stratigraphic units based on a slice of seismic image data from a seismic cube. In such an example, the method can include interpolating between the series of 2D stratigraphic units to generate a 3D model of stratigraphic units. As to interpolation, linear and/or nonlinear approaches may be implemented. As an example, a spline fitting approach may be implemented where constraints may be imposed, for example, based on output from a slice that may be orthogonal to the series of 2D stratigraphic units. As an example, a method can include generating a series of 2D stratigraphic units along a first dimension and generating a series of 2D stratigraphic units along a second dimension, which may be orthogonal to the first dimension. In such an example, a 3D model of stratigraphic units may be built using the two series (e.g., or more series), optionally using interpolation.

While various examples refer to stratigraphic units, one or more methods may be applied more generally to a pattern or patterns where, for example, the pattern or patterns include vertical diversity (e.g., depthwise diversity). As an example, a CNN can be trained using training data that includes a pattern or patterns that can be labeled with respect to depth (e.g., depth information) to generate a trained CNN. Such a trained CNN may be implemented to identify one or more patterns in seismic image data.

Figure 16:
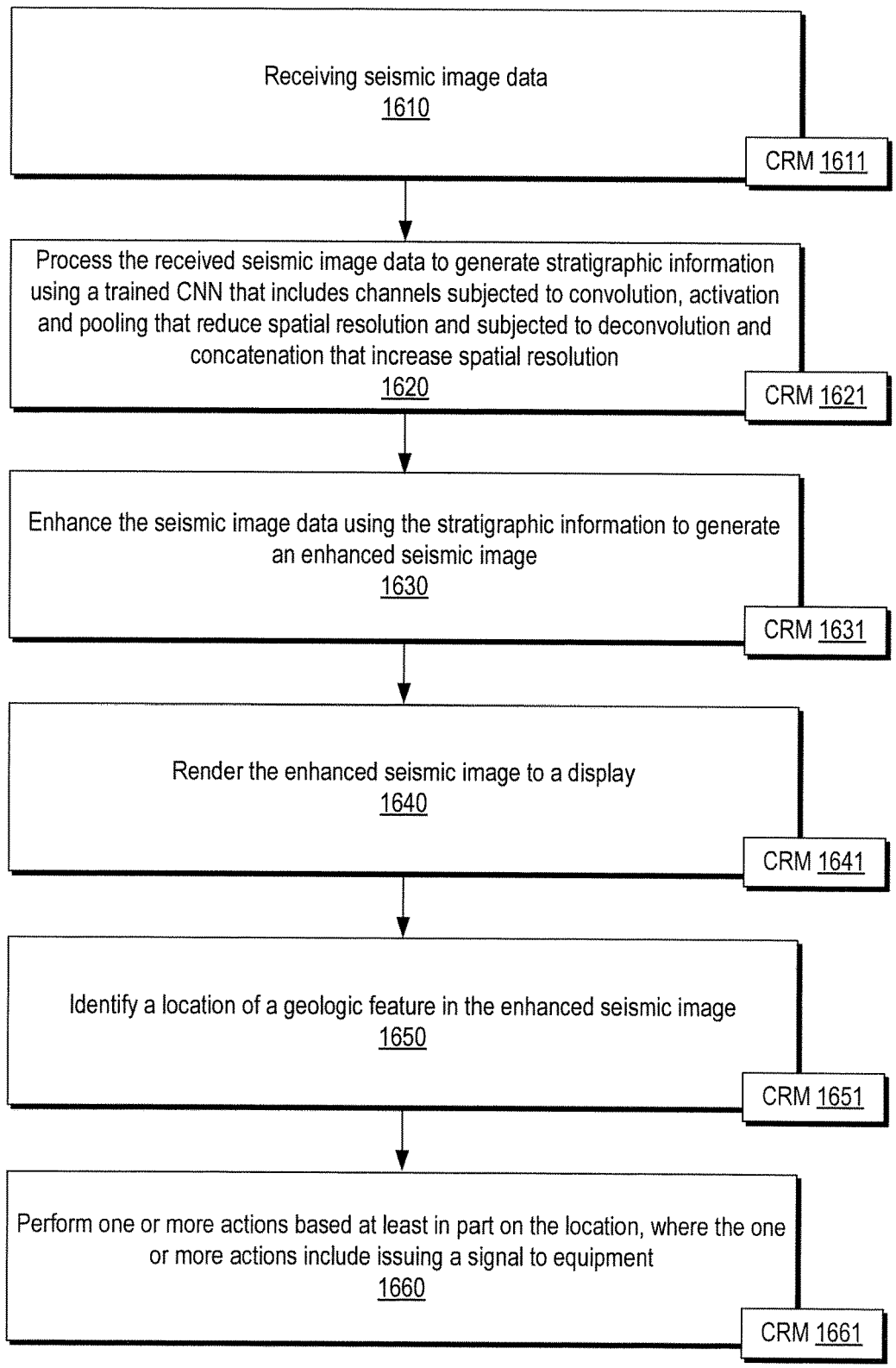
FIG. 16 illustrates an example of a method.

FIG. 16 shows an example of a method 1600 that includes a reception block 1610 for receiving seismic image data; a process block 1620 for processing the received seismic image data to generate stratigraphic information using a trained convolution neural network (CNN) that includes channels subjected to convolution, activation and pooling that reduce spatial resolution and subjected to deconvolution and concatenation that increase spatial resolution; and an enhancement block 1630 for enhancing the seismic image data using the stratigraphic information to generate an enhanced seismic image. As shown, the method 1600 can include one or more additional blocks such as a render block 1640 for rendering the enhanced seismic image to a display, an identification block 1650 for identifying a location of a geologic feature in the enhanced seismic image (e.g., as rendered to the display), and a performance block 1660 for performing one or more actions based at least in part on the location where the one or more actions can include issuing a signal to equipment (e.g., consider drilling equipment that receives a signal to drill a borehole to the location, etc.).

As shown, the method 1600 may be implemented in part via one or more computer-readable storage media (CRM) blocks 1611, 1621, 1631, 1641, 1651 and 1661. Such CRM blocks include instructions executable by a processor to instruct a device such as a computing device, a computing system, a controller, etc. A computer-readable storage medium or media (CRM) is or are a non-transitory medium or media that is or are not a carrier wave and not a signal. As an example, the instructions 270 of the system 250 of FIG. 2 can include instructions as in one or more of the CRM blocks 1611, 1621, 1631, 1641, 1651 and 1661.

In the example of FIG. 16, the process block 1620 may include utilizing a CNN with an architecture that includes one or more features of the architecture of the CNN architecture 1100 of FIG. 11.

As an example, a method can include receiving seismic image data; processing the received seismic image data to generate stratigraphic information using a trained convolution neural network that includes channels subjected to convolution, activation and pooling that reduce spatial resolution and subjected to deconvolution and concatenation that increase spatial resolution; and enhancing the seismic image data using the stratigraphic information to generate an enhanced seismic image. In such an example, the processing the received seismic image date can include processing tiles of the seismic image data where the tiles have a depth dimension that exceeds a lateral dimension. As an example, seismic image data can be represented as pixel image data. As an example, a method can be a computer-implemented method (e.g., the method 1600 of FIG. 16 can be a computer-implemented method).

As an example, a trained convolution neural network can include a "U" shaped architecture. As an example, a trained convolution neural network can include at least two processes that reduce spatial resolution. As an example, a trained convolution neural network can include at least two processes that increase spatial resolution.

As an example, channels associated with seismic image data can include a depth channel where, for example, the depth channel includes depth information. In such an example, the depth information may be referenced with respect to a surface of the Earth.

As an example, a method can include training a convolution neural network to generate a trained convolution neural network. In such an example, training can include interpreting a portion of seismic image data to generate labeled training data and processing the labeled training data to generate the trained convolution neural network. As an example, labeling can include depth labeling, for example, to provide information for a depth channel. As an example, labeling can include interpretation labeling to provide information as to an interpretation channel. As an example, an interpretation channel can include information such as whether or not a location in a seismic image is a reflector or not a reflector. A location that is in the middle of a layer of material with relatively homogenous properties may be a location that is labeled as not a reflector, which may be via interpretation by visual inspection of a seismic image, via automated interpretation by machine, via a default setting (picking changes from default of not a reflector to a reflector), etc. As an example, a method can include augmenting a portion of seismic image data to generate labeled training data and processing the labeled training data to generate the trained convolution neural network. In such an example, augmenting can include compacting, expanding or compacting and expanding the portion of the seismic image data. As an example, a method can include generating synthetic labeled training data and utilizing the generated synthetic labeled training data to train a convolution neural network.

As an example, a method can include rendering an enhanced seismic image to a display. For example, consider rendering a composite image of seismic image data and stratigraphic information to a display where the stratigraphic information enhances the seismic image data. Such an approach may utilize colors such as individual colors that represent different, corresponding stratigraphic units.

As an example, a method can include locating a position in an enhanced seismic image that corresponds to hydrocarbons (e.g., a reservoir that includes hydrocarbons) and, for example, determining a drilling trajectory for a well that targets the position in the enhanced seismic image that corresponds to hydrocarbons. As an example, a method can include using an enhanced seismic image in a drilling operation that drills a borehole to a position in the enhanced seismic image that corresponds to a reservoir.

As mentioned, stratigraphic information can include one or more stratigraphic units.

As an example, a system can include a processor; memory operatively coupled to the processor; and processor-executable instructions stored in the memory to instruct the system to: receive seismic image data; process the received seismic image data to generate stratigraphic information using a trained convolution neural network that includes channels subjected to convolution, activation and pooling that reduce spatial resolution and subjected to deconvolution and concatenation that increase spatial resolution; and enhance the seismic image data using the stratigraphic information to generate an enhanced seismic image.

As an example, one or more computer-readable storage media can include computer-executable instructions executable to instruct a computing system to receive seismic image data; process the received seismic image data to generate stratigraphic information using a trained convolution neural network that includes channels subjected to convolution, activation and pooling that reduce spatial resolution and subjected to deconvolution and concatenation that increase spatial resolution; and enhance the seismic image data using the stratigraphic information to generate an enhanced seismic image.

Figure 17:
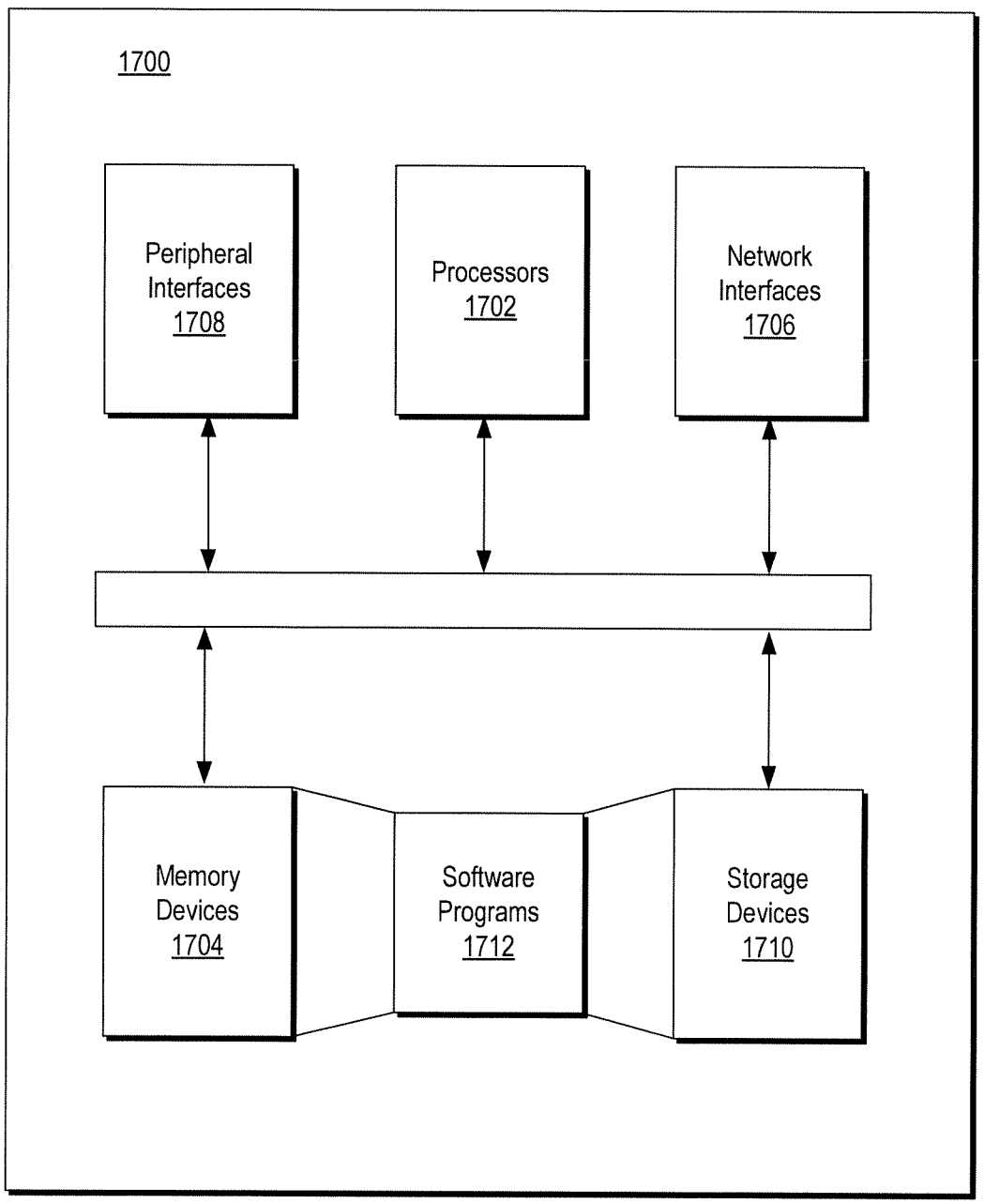
FIG. 17 illustrates examples of equipment.

Embodiments of the disclosure may also include one or more systems for implementing one or more embodiments of the method for identifying stratigraphic units using machine learning. FIG. 17 illustrates a schematic view of such a computing or processor system 1700, according to an embodiment. The processor system 1700 may include one or more processors 1702 of varying core configurations (including multiple cores) and clock frequencies. The one or more processors 1702 may be operable to execute instructions, apply logic, etc. It will be appreciated that these functions may be provided by multiple processors or multiple cores on a single chip operating in parallel and/or communicably linked together. In at least one embodiment, the one or more processors 1702 may be or include one or more GPUs.

The processor system 1700 may also include a memory system, which may be or include one or more memory devices and/or computer-readable media 1704 of varying physical dimensions, accessibility, storage capacities, etc. such as flash drives, hard drives, disks, random access memory, etc., for storing data, such as images, files, and program instructions for execution by the processor 1702. In an embodiment, the computer-readable media 1704 may store instructions that, when executed by the processor 1702, are configured to cause the processor system 1700 to perform operations. For example, execution of such instructions may cause the processor system 1700 to implement one or more portions and/or embodiments of the method(s) described above.

The processor system 1700 may also include one or more network interfaces 1706. The network interfaces 1706 may include hardware, applications, and/or other software. Accordingly, the network interfaces 1706 may include Ethernet adapters, wireless transceivers, PCI interfaces, and/or serial network components, for communicating over wired or wireless media using protocols, such as Ethernet, wireless Ethernet, etc.

As an example, the processor system 1700 may be a mobile device that includes one or more network interfaces for communication of information. For example, a mobile device may include a wireless network interface (e.g., operable via one or more IEEE 802.11 protocols, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

The processor system 1700 may further include one or more peripheral interfaces 1708, for communication with a display, projector, keyboards, mice, touchpads, sensors, other types of input and/or output peripherals, and/or the like. In some implementations, the components of processor system 1700 are not necessarily enclosed within a single enclosure or even located in close proximity to one another, but in other implementations, the components and/or others may be provided in a single enclosure. As an example, a system may be a distributed environment, for example, a so-called "cloud" environment where various devices, components, etc. interact for purposes of data storage, communications, computing, etc. As an example, a method may be implemented in a distributed environment (e.g., wholly or in part as a cloud-based service).

As an example, information may be input from a display (e.g., a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

The memory device 1704 may be physically or logically arranged or configured to store data on one or more storage devices 1710. The storage device 1710 may include one or more file systems or databases in any suitable format. The storage device 1710 may also include one or more software programs 1712, which may contain interpretable or executable instructions for performing one or more of the disclosed processes. When requested by the processor 1702, one or more of the software programs 1712, or a portion thereof, may be loaded from the storage devices 1710 to the memory devices 1704 for execution by the processor 1702.

The processor system 1700 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 1700 may be used to execute programs according to instructions received from another program or from another processor system altogether. Similarly, commands may be received, executed, and their output returned entirely within the processing and/or memory of the processor system 1700.

As an example, one or more computer-readable storage media can include computer-executable instructions executable to instruct a computing system to perform one or more methods or portions thereof described herein.

As an example, a workflow may be associated with various computer-readable medium (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium that is non-transitory, not a carrier wave and not a signal. As an example, blocks may be provided as one or more sets of instructions, for example, such as the one or more sets of instructions 270 of the system 250 of FIG. 2 (e.g., processor-executable instructions, etc.).

Figure 18:
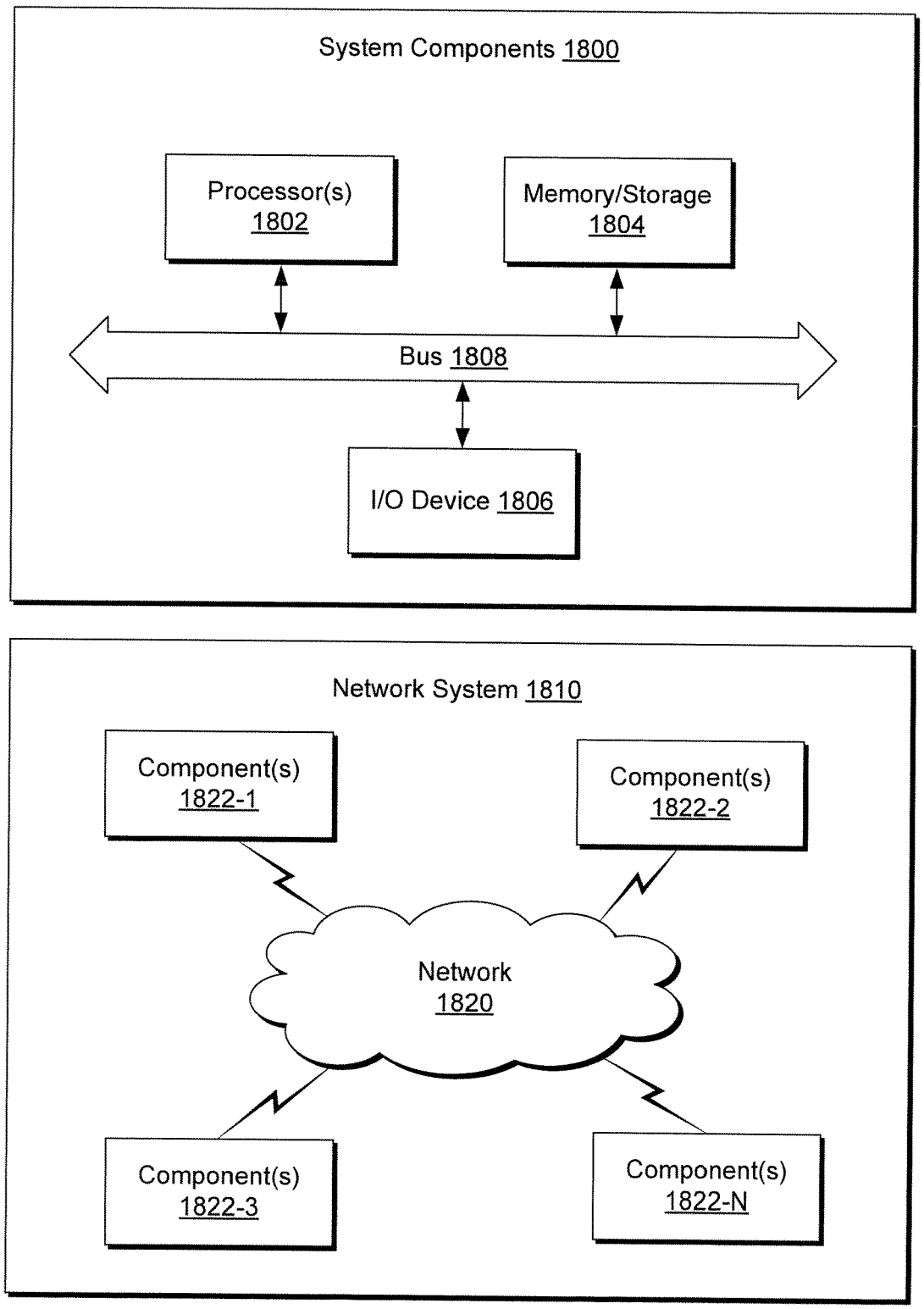
FIG. 18 illustrates example components of a system and a networked system.

FIG. 18 shows components of an example of a computing system 1800 and an example of a networked system 1810. The system 1800 includes one or more processors 1802, memory and/or storage components 1804, one or more input and/or output devices 1806 and a bus 1808. In an example embodiment, instructions may be stored in one or more computer-readable media (e.g., memory/storage components 1804). Such instructions may be read by one or more processors (e.g., the processor(s) 1802) via a communication bus (e.g., the bus 1808), which may be wired or wireless. The one or more processors may execute such instructions to implement (wholly or in part) one or more attributes (e.g., as part of a method). A user may view output from and interact with a process via an I/O device (e.g., the device 1806). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1810. The network system 1810 includes components 1822-1, 1822-2, 1822-3, . . . 1822-N. For example, the components 1822-1 may include the processor(s) 1802 while the component(s) 1822-3 may include memory accessible by the processor(s) 1802. Further, the component(s) 1802-2 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving seismic image data for a seismic image and depth information of a plurality of pixels in the seismic image, wherein the depth information is with respect to a reference location on the Earth;
   processing, through a trained convolution neural network, the received seismic image data with the depth information to generate stratigraphic information, wherein the trained convolution neural network comprises channels subjected to convolution, activation and pooling that reduce spatial resolution and subjected to deconvolution and concatenation that increase spatial resolution, wherein the channels comprise a depth channel with the depth information; and
   enhancing the seismic image data using the stratigraphic information to generate an enhanced seismic image.

2. The method of claim 1, wherein the processing the received seismic image data comprises processing tiles of the seismic image data, wherein the tiles comprise a depth dimension that exceeds a lateral dimension.

3. The method of claim 1, wherein the seismic image data comprises pixel image data.

4. The method of claim 1, wherein the trained convolution neural network comprises a "U" shaped architecture.

5. The method of claim 1, wherein the trained convolution neural network comprises at least two processes that reduce spatial resolution.

6. The method of claim 1, wherein the trained convolution neural network comprises at least two processes that increase spatial resolution.

7. The method of claim 1, further comprising:
training a convolution neural network to generate the trained convolution neural network, wherein the training comprises:
interpreting a portion of the seismic image data to generate labeled training data and processing the labeled training data to generate the trained convolution neural network, wherein generating the labeled training data comprises augmenting the portion of the seismic image data,
wherein the augmenting comprises generating synthetic labeled training data.

8. The method of claim 1, comprising rendering the enhanced seismic image to a display.

9. The method of claim 1, comprising locating a position in the enhanced seismic image that corresponds to hydrocarbons.

10. The method of claim 9, comprising determining a drilling trajectory for a well that targets the position in the enhanced seismic image that corresponds to hydrocarbons.

11. The method of claim 1, comprising using the enhanced seismic image in a drilling operation that drills a borehole to a position in the enhanced seismic image that corresponds to a reservoir.

12. The method of claim 1, wherein the stratigraphic information comprises stratigraphic units.

13. The method of claim 1, further comprising:
training a convolution neural network to generate the trained convolution neural network, wherein the training comprises interpreting a portion of the seismic image data to generate labeled training data and processing the labeled training data to generate the trained convolution neural network.

14. The method of claim 1, further comprising:
training a convolution neural network to generate the trained convolution neural network, wherein the training comprises:
interpreting a portion of the seismic image data to generate labeled training data and processing the labeled training data to generate the trained convolution neural network, wherein generating the labeled training data comprises augmenting the portion of the seismic image data.

15. The method of claim 1, wherein the depth information is on a per pixel basis of the seismic image.

16. A system comprising:
a processor;
memory operatively coupled to the processor; and
processor-executable instructions stored in the memory to instruct the system to:
receive seismic image data for a seismic image and depth information of a plurality of pixels in the seismic image, wherein the depth information is with respect to a reference location on the Earth;
process, through a trained convolution neural network, the received seismic image data with the depth information to generate stratigraphic information, wherein the trained convolution neural network comprises channels subjected to convolution, activation and pooling that reduce spatial resolution and subjected to deconvolution and concatenation that increase spatial resolution, wherein the channels comprise a depth channel with the depth information; and
enhance the seismic image data using the stratigraphic information to generate an enhanced seismic image.

17. One or more computer-readable storage media comprising computer-executable instructions executable to instruct a computing system to perform a method comprising:
receiving seismic image data for a seismic image and depth information of a plurality of pixels in the seismic image, wherein the depth information is with respect to a reference location on the Earth;
processing, through a trained convolution neural network, the received seismic image data with the depth information to generate stratigraphic information, wherein the trained convolution neural network comprises channels subjected to convolution, activation and pooling that reduce spatial resolution and subjected to deconvolution and concatenation that increase spatial resolution, wherein the channels comprise a depth channel with the depth information; and
enhancing the seismic image data using the stratigraphic information to generate an enhanced seismic image.

* * * * *